(12) United States Patent
Hansen et al.

(10) Patent No.: US 12,232,565 B2
(45) Date of Patent: Feb. 25, 2025

(54) METHOD OF MANUFACTURING A FOOTWEAR

(71) Applicant: ECCO Sko A/S, Bredebro (DK)

(72) Inventors: Jakob Moller Hansen, Bredebro (DK); Jose Augusto Marques, Bredebro (DK); Severino Almeida, Bredebro (DK); Agnes Hildegard Kraft, Bredebro (DK); Andre Gonzaga Oliveira, Bredebro (DK); Thomas Gogsig, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 435 days.

(21) Appl. No.: 17/433,979

(22) PCT Filed: Feb. 26, 2020

(86) PCT No.: PCT/DK2020/050052
§ 371 (c)(1),
(2) Date: Aug. 25, 2021

(87) PCT Pub. No.: WO2020/173532
PCT Pub. Date: Sep. 3, 2020

(65) Prior Publication Data
US 2022/0132991 A1    May 5, 2022

(30) Foreign Application Priority Data
Feb. 26, 2019  (DK) .................... 2019 70122

(51) Int. Cl.
*A43B 23/02* (2006.01)
*B32B 7/12* (2006.01)
(Continued)

(52) U.S. Cl.
CPC ........ *A43B 23/0255* (2013.01); *A43B 23/021* (2013.01); *B32B 7/12* (2013.01);
(Continued)

(58) Field of Classification Search
None
See application file for complete search history.

(56) References Cited

U.S. PATENT DOCUMENTS 2,160,878 A   6/1939  La Valle
4,705,586 A   11/1987 Pouget et al.
(Continued)

FOREIGN PATENT DOCUMENTS

CN   1147263 A    4/1997
CN   103607917 A  2/2014
(Continued)

OTHER PUBLICATIONS

"Album Making Machines & Consumables on sales of p. 2—Quality Album Making Machines & Consumables supplier", Mar. 26, 2018, XP055724108, retrieved from the Internet on Aug. 20, 2020 at <<https://web.archive.org/web/20180326235232/http://www.saintbestgroup.com/supplier-132972p2-album-making-machines-consumables>>, 2 pages.
(Continued)

*Primary Examiner* — Barbara J Musser
(74) *Attorney, Agent, or Firm* — Lee & Hayes, P.C.

(57) ABSTRACT

A method of manufacturing a footwear includes the steps of providing a leather base layer and providing a leather attachment layer. The leather base layer and the leather attachment layer are fixed against each other with an intermediate application of adhesive between them. The applied adhesive is activated. The leather base layer and the leather attachment layer are forced against each other under a pressure with the adhesive between them. The adhesive is cured and thereby the leather base layer and the leather attachment layer are bonded to each other. The bonded leather base layer and the leather attachment layer are integrated as part of the footwear.

15 Claims, 11 Drawing Sheets

(51) Int. Cl.
   *B32B 9/02* (2006.01)
   *B32B 37/12* (2006.01)
   *B32B 41/00* (2006.01)

(52) U.S. Cl.
   CPC .............. *B32B 9/025* (2013.01); *B32B 37/12* (2013.01); *B32B 41/00* (2013.01); *B32B 2037/1253* (2013.01); *B32B 2309/72* (2013.01); *B32B 2310/0825* (2013.01); *B32B 2310/0831* (2013.01); *B32B 2317/08* (2013.01); *B32B 2437/02* (2013.01)

(56) References Cited

U.S. PATENT DOCUMENTS

| | | | |
|---|---|---|---|
| 5,028,285 | A | 7/1991 | Wyler |
| 5,965,662 | A | 10/1999 | Krebs et al. |
| 2014/0017459 | A1* | 1/2014 | Davis ............... B32B 38/1841 156/64 |
| 2015/0089752 | A1 | 4/2015 | Liu |
| 2017/0233945 | A1 | 8/2017 | Purcell et al. |
| 2022/0395061 | A1 | 12/2022 | Mayershofer et al. |

FOREIGN PATENT DOCUMENTS

| | | |
|---|---|---|
| CN | 103687507 A | 3/2014 |
| CN | 104754976 A | 7/2015 |
| CN | 110831755 A | 2/2020 |
| EP | 3335876 | 6/2018 |
| IT | FI20120117 | 12/2013 |
| JP | S5774709 | 11/1982 |
| JP | H11320707 | 11/1999 |

OTHER PUBLICATIONS

Anonymous: "Automatic UV Lamination Machine", Aug. 20, 2020, XP0557244111, retrieved from the Internet on Aug. 20, 2020 at <<http://saintbestgroup.com/sale-8104002-automatic-uv-lamination-machine.html>>, 3 pages.

Boggs Equipment: "A1s Co 480 UV Cold Laminating Machine", YouTube, Jul. 24, 2017, XP054980804, retrieved from the Internet on Aug. 20, 2020 at <<https://www.youtube.com/watch?v=q5rtc5FNolA>>, 1 page.

Covington, Tony "Tanning Chemistry, The Science of Leather", The University of Northampton, Northampton UK, 2009, Chapter 10, 11 pages.

DK Search Report for corresponding DK Patent Application No. PA 2019 70122 dated Sep. 16, 2019, 4 pages.

PCT International Search Report for corresponding PCT Application No. PCT/DK2020/050052 dated Sep. 1, 2020, 6 pages.

Shunyang, Deng, "Chemical Formula and Process Manual", Shanghai Scientific, Jan. 31, 2003, pp. 72-73.

* cited by examiner

METHOD OF MANUFACTURING A FOOTWEAR

This application claims priority to PCT Application No. PCT/DK2020/050052, filed Feb. 26, 2020, which claims priority to DK Patent Application No. PA 2019 70122, filed Feb. 26, 2019, the contents of each of which is incorporated herein by reference.

The invention relates to a method of gluing leather layers of a footwear.

BACKGROUND OF THE INVENTION

When designing and manufacturing leather-based footwear such as shoes, it is well-known that the manufacturing and the possible designs of such footwear deviates significantly from footwear made from e.g. textiles. The opportunities are different, and the challenges are different. The leather-based footwear may be provided as very comfortable and may insulate against heat or cold while maintaining a breathability. It is however also well-known that leather shoes are difficult to construct e.g. in terms of strength and weight, in particular when the footwear upper comprises multiple layers of leather layers. The construction may become stiff and the construction may also become relatively expensive as complex layers patterns are expensive in terms of manufacturing.

SUMMARY

The invention relates to a method of manufacturing a footwear comprising the steps of
  providing a leather base layer (LBL),
  providing a leather attachment layer (LAL),
  fixing the leather base layer (LBL) and the leather attachment layer (LAL) against each other with an intermediate application of adhesive (A) between them,
  activating the applied adhesive (A),
  forcing the leather base layer (LBL) and the leather attachment layer (LAL) against each other under a pressure P with the adhesive (A) between them,
  curing the adhesive and thereby bonding the leather base layer (LBL) and the leather attachment layer (LAL) to each other, and
  integrating the bonded leather base layer (LBL) and the leather attachment layer (LAL) as part of a footwear.

The invention also relates to a method of adhering leather layers of a footwear comprising the steps of
  providing a leather base layer (LBL),
  providing a leather attachment layer (LAL),
  fixing the leather base layer (LBL) and the leather attachment layer (LAL) against each other with an intermediate application of adhesive (A) between them,
  activating the applied adhesive (A),
  forcing the leather base layer (LBL) and the leather attachment layer (LAL) against each other under a pressure P with the adhesive (A) between them,
  curing the adhesive and thereby bonding the leather base layer (LBL) and the leather attachment layer (LAL) to each other, and
  integrating the bonded leather base layer (LBL) and the leather attachment layer (LAL) as part of a footwear.

The invention furthermore relates to a method of manufacturing a footwear comprising the steps of
  providing a leather base layer (LBL),
  providing a leather attachment layer (LAL),
  fixing the leather base layer (LBL) and the leather attachment layer (LAL) against each other with an intermediate application of adhesive (A) between them,
  subjecting the applied adhesive (A) to pressure and heat thereby
  forcing the leather base layer (LBL) and the leather attachment layer (LAL) against each other under a pressure P with the adhesive (A) between them while melting the adhesive (A),
  cooling the adhesive (A) thereby bonding the leather base layer (LBL) and the leather attachment layer (LAL) to each other, and
  integrating the bonded leather base layer (LBL) and the leather attachment layer (LAL) as part of a footwear.

The invention also relates to a method of adhering leather layers of a footwear comprising the steps of
  providing a leather base layer (LBL),
  providing a leather attachment layer (LAL),
  fixing the leather base layer (LBL) and the leather attachment layer (LAL) on top of each other with an intermediate application of adhesive (A) between them,
  subjecting the applied adhesive (A) to heat and pressure in a heating step thereby
  forcing the leather base layer (LBL) and the leather attachment layer (LAL) against each other under a pressure P with the adhesive (A) between them while melting the adhesive (A) and subsequently actively or passively cooling the adhesive (A) thereby bonding the leather base layer (LBL) and the leather attachment layer (LAL) to each other, and integrating the bonded leather base layer (LBL) and the leather attachment layer (LAL) as part of a footwear.

The inventive method of making a footwear has several advantages over prior art footwear manufacturing methods involving the application of leather. The present invention makes it possible to obtain a multilayered structure of leather layers mutually bonded by glue, and the obtained bonding is strong and robust to stress during daily use of the footwear. The bonded leather layers of the footwear has also proven robust to steam treatment necessary when forming the final footwear. The freedom in design is significantly increased as both distinct shoe parts, such as outer counter or toe caps may now be glued to the footwear without stitching. This keeps manufacturing costs down, but it also adds to the overall flexibility of the upper shoe as such. It is also now possible to apply complex leather patterns to the base layer(s), e.g. the vamp of a shoe or a shaft of a boot without stitching.

It should be noted that top grain surface is intended to cover different degrees of finishing, including buffed top grain. It may within the scope of the invention be advantageous to preprocess the top grain surface of the leather base layer prior to gluing as this may facilitate a better bonding between the leather attachment layer and the leather base layer.

A cow/calf hide is an attractive source of hide for the inventive leather layers, as the strength, composition, visual appearance, flexibility and the thickness in the final footwear is attractive. Is should be noted that e.g. the leather attachment layer(s) may e.g. originate from other types of hides. In other words, the origin of the hides/leather may be different for the leather base layer and the leather attachment layer.

An advantage of gluing at least two pieces of leather together is a special and useful appearance and look of the footwear where it is applied.

A further advantage is that the process of gluing leather pieces together is cost effective and energy saving compared to the typically manual costly sewing processes.

Curing, including cooling may preferably be performed in a separate step subsequent to the pressure and activation step.

Curing, when including cooling may preferably be performed in a separate step subsequent to the pressure and heating step, e.g. a combined step, where the hot-melt glue is melted while keeping the stacked leather layers under pressure.

The curing, including cooling, may be passive or active, meaning that the process steps or the machinery may be adapted to actively cool (e.g. where the compression parts are actively able to vary temperature to both heat in the beginning of the process and then subsequently cool at a later stage without moving the leather assembly from the machine.

The curing may advantageously be performed, monitored and controlled in an automated manner, and the curing may also include keeping the bonding leather at ambient conditions in a predetermined time or a dynamically and automatically determined time during the process.

The intended bonding under pressure or the cooling may be performed alternatively and/or may also be performed at different stations as described or indicated below, i.e. by subjecting the leather assembly to heat and pressure with compression parts having constant heat at the same time at one station and then subsequently move the assembly from the heated compression parts to another station where the assembly is again pressed but under reduced temperature.

In an embodiment of the invention, the method may include the step of activating the adhesive (A) and then forcing the leather base layer (LBL) and the leather attachment layer (LAL) against each other under a pressure P.

In an embodiment of the invention, the method may include the step of forcing the leather base layer (LBL) and the leather attachment layer (LAL) against each other under a pressure P with the adhesive (A) between them while activating the adhesive (A), In an embodiment of the invention, the process of curing the adhesive is performed while forcing the leather base layer (LBL) and the leather attachment layer (LAL) against each other under pressure P with the adhesive (A) between.

In an embodiment of the invention, the process of curing involves cooling the adhesive (A) thereby bonding the leather base layer (LBL) and the leather attachment layer (LAL) to each other.

The cooling process may be active or passive, e.g. obtained through ambient cooling. It is however noted that the automated and preferred embodiment of the invention implies that the cooling process, even if the adhesive is merely subjected to ambient conditions, involves that the duration of the cooling process is automatically monitored and used as a control parameter for a correct and optimized curing process in an inline or other types of manufacturing systems.

In an embodiment of the invention, the method of manufacturing a footwear may include activating the applied adhesive (A) by subjecting the adhesive to heat.

The application of heat as a means for activation of heat is somewhat surprising, in particular in an industrial process, in particular when the adhesive has to be activated by heat transmitted to the adhesive through at least one of the leather layers. It should be noted that activation by heat applied when the two leather layers are forced together will very likely invoke shrinkage of the leather but is has proven possible to forecast the degree of shrinkage, even during consideration of two different layers, and very likely different shrinkage.

The activation, also referred to a curing, may e.g. by obtained by thermo curing, radiation curing, curing obtained through chemical activation, electro-curing, etc. The use of different types of curing methods are only The cooling process may be passive or active as long as the necessary and desired bonding can be obtained.

In the present context fixing the leather base layer (LBL) and the leather attachment layer (LAL) against each other with an intermediate application of adhesive (A) between them basically means that the two layers are stacked in such a way that at least a part of the leather layers, i.e. the leather layers that are to be adhered are overlapping and that adhesive is present in at least a part of the overlapping area.

In an embodiment of the invention, the applied adhesive (A) is activated by subjecting the adhesive to UV-radiation (UV: Ultra violet radiation), IR (IR: Infrared radiation), Ultrasound or any combination thereof.

Activation of adhesive, e.g. by means of UV radiation, facilitates an activation which may be applied in a much more targeted and may therefore be applicable for selective activation e.g. of the adhesive without subjecting the leather to heat and thereby shrinkage.

In an embodiment of the invention, the subjecting the applied adhesive to heat involves a shrinking of at least one of the leather layers, the leather base layer (LBL) and/or the leather attachment layer (LAL).

In an embodiment of the invention, the subjecting the applied adhesive to heat involves a shrinking of at least one of the leather layers, the leather base layer (LBL) and the leather attachment layer (LAL) and wherein the heating temperature T and the heating time is adapted to shrink the leather layers, the leather base layer (LBL) and/or the leather attachment layer (LAL) to predetermined dimension fitting the footwear.

In an embodiment of the invention said method comprises the step of shrinking at least one of the leather base layer (LBL) and the leather attachment layer (LAL) when heating the adhesive (A).

In an embodiment of the invention heating the adhesive (A) is continued over a period of time and/or heated to a temperature by which at least one of the leather base layer (LBL) and the leather attachment layer (LAL) will shrink within a predetermined dimension range.

In an embodiment of the invention the adhesive (A) is heated for a predetermined time and/or the adhesive is heated to a predetermined temperature corresponding to a predetermined shrinkage of at least one of the leather base layer (LBL) and the leather attachment layer (LAL).

In an embodiment of the invention the adhesive (A) is heated and/or the temperature the adhesive is heated to is determined according to a shrinkage of at least one of the leather base layer (LBL) and the leather attachment layer (LAL).

It should be noted that the dimensioning of the footwear pieces/parts to be attached to a leather base layer of a footwear, if pre-cut, during manufacture must be cut out of the leather in a size/dimension different from the final dimension of the leather attachment layer when glued to the final footwear. Given this information, the skilled person would be able to select the right leather attachment layer, with the right thickness and adapting the over-dimensioning of the pre-cut part (the pre-cut leather attachment layer) so as to fit to the final intended dimensions.

In an embodiment of the invention, the adhesive is formed of a thermoplastic material.

In an embodiment of the invention, the thermoplastic material is a co-polyamide.

In an embodiment of the invention, the thermoplastic material is a polyurethane.

In an embodiment of the invention, the applied adhesive is a foil prior to bonding.

In an embodiment of the invention, the applied adhesive is a web prior to bonding.

In an embodiment of the invention, the provided bonding is non-reactive.

In an embodiment of the invention, the viscosity of the adhesive is low when the adhesive has a temperature above the Tg (Tg: Glass transition temperature).

In an embodiment of the invention, the melting point of the adhesive is above 97 Celsius degrees, preferably above 100 and most preferably above 105.

In an embodiment of the invention, the heat is subjected to the applied adhesive (A) through the leather base layer (LBL) and/or the leather attachment layer (LAL).

In an embodiment of the invention, the leather base layer (LBL) is glued to the leather attachment layer (LAL) by means of non-reactive glue.

Non-reactive glue includes e.g. hot-melt adhesives including thermo-polymer, polyamide, polyesters, polyurethane, polyolefins etc.

Hot melt glues may consist of one base material with various additives. The composition is usually formulated to have a glass transition temperature (onset of brittleness) and a suitable high melt temperature as well.

In an embodiment of the invention, the non-reactive glue is a hot-melt adhesive having a Tg (Tg: Glass transition temperature) between 100 degrees Celsius and 200 degrees Celsius, such as between 110 degrees Celsius and 200 degrees Celsius, such as between 120 degrees Celsius and 200 degrees Celsius, such as between 100 degrees Celsius and 180 degrees Celsius, such as between 100 degrees Celsius and 170 degrees Celsius.

An advantage of applying heat to the process is that it is possible to control the adherence of adhesive to leather. The temperature is raised as the adhesive most preferably is applied to the leather as e.g. a web and needs to be heated in order to melt and mediate a strong binding of the leather pieces.

A further important advantage of applying high temperatures during the adhesion process is that the adhesion will keep its strong binding thorough out the following steps of finishing a footwear. These steps may include e.g. re-heating steps e.g. steaming.

In an embodiment of the invention, the pressure P is at least 2 bars, such as at least 3 bars, such as at least 4 bars.

In an embodiment of the invention, the duration of the heating step is at least 15 sec., such as at least 20 sec., such as at least 25 sec., such as at least 30 sec.

An advantage of applying heat to the process is that it is possible to control the adherence of adhesive to leather. The temperature is raised as the adhesive most preferably is applied to the leather as a foil or web and needs to be heated in order to melt and mediate a strong binding of the leather pieces.

An advantage of applying pressure to the leather during heating of the leather is that the temperature of the leather may be lower than if not applying pressure. The lower temperature is an advantage as the leather may not be burned and it will further keep the leather in the right shape with a minimum of shrinkage. If the temperature is too high, the leather may lose its moisture and therefore turn hard and wavy and thereby loose the flexibility and softness of the leather.

It should also be noted that the heating time must be kept below a maximum where the heating may damage or change the leather layer properties.

In an embodiment of the invention, the leather base layer (LBL) is formed of top grain leather, wherein the top-grain side is facing towards the leather attachment layer (LAL).

In an embodiment of the invention, the leather attachment layer (LAL) is formed of top-grain leather, having the flesh-side facing the towards the leather base layer (LBL)

In an embodiment of the invention, the leather attachment layer (LAL) is formed of top-grain leather, having the top-grain side facing the towards the leather base layer (LBL)

In an embodiment of the invention, the top-grain side of the leather attachment layer (LAL) and/or the leather base layer (LBL) is buffed.

In an embodiment of the invention, the leather attachment layer (LAL) is formed of top-grain leather, having the top-grain side facing towards the exterior of the footwear.

In an embodiment of the invention, the leather attachment layer (LAL) has a thickness of less than 1.4 mm, such as less than 1.2 mm, such as less than 1.0 mm, such as less than 0.9 mm.

In an embodiment of the invention, the leather attachment layer (LAL) has a thickness of less than 1.4 mm, such as less than 1.2 mm, such as less than 1.0 mm, such as less than 0.9 mm and wherein the leather attachment layer (LAL) is a top grain leather.

When reducing the thickness of a top grain leather from the flesh-side, to the above or below indicated thicknesses, the leather attachment layer will get an improved and well-ordered flesh-side of the top grain leather. This also means that the distribution of fibres at the top grain leather gradually is becoming more uniform and closer to the top-grain distribution thereby facilitating glue bonding to the flesh-side of the leather attachment layer. Other mechanisms may be drivers for the improved bonding experienced and facilitated by the reduced thickness of the leather attachment layer.

In an embodiment of the invention, the thickness of the leather attachment layer (LAL) is between 0.3 mm to 2.0 mm, such as between 0.5 mm to 2.0 mm, such as between 0.5 mm to 1.5 mm, such as between 0.7 mm to 1.3 mm In an embodiment of the invention, the thickness of the leather attachment layer (LAL) is between 0.3 mm to 2.0 mm, such as between 0.5 mm to 2.0 mm, such as between 0.5 mm to 1.5 mm, such as between 0.7 mm to 1.3 mm and wherein the leather base layer (LBL) and the leather attachment layer (LAL) is formed on the basis of cow hide.

In an embodiment of the invention, the thickness of two adhered leather layers (LBL, LAL) is between 0.5 mm and 4 mm, such as between 0.7 to 3.5 mm, such as 0.9 mm to 3.3 mm, such as 1.0 mm to 3 mm, such as 1.3 mm to 2.8 mm, such as 1.5 mm to 2.5 mm, such as 1.2 mm to 2.2 mm, such as 1.0 to 2.0 mm, such as 0.8 to 1.8 mm.

In an embodiment of the invention, the leather attachment layer (LAL) is thinner than the leather base layer (LBL).

The thickness of a leather layer may e.g. be measured by a SATRA STD 483 "Thickness gauge for leather"

In an embodiment of the invention, the leather base layer (LBL) is forming at least part of a leather quarter of a footwear.

In an embodiment of the invention, the leather base layer (LBL) is forming at least part of a leather vamp of a footwear.

In an embodiment of the invention, the leather attachment layer (LAL) is forming at least part of a leather counter of a footwear.

In an embodiment of the invention, the leather attachment layer (LAL) is forming part of a leather toe cap of a footwear.

In an embodiment of the invention, the leather attachment layer (LAL) is a pattern defining part of the shoe facing towards the exterior, preferably bonded to the vamp and/or a quarter of a shoe.

In an embodiment of the invention, the leather attachment layer (LAL) is a plurality of pattern defining parts of the shoe facing towards the exterior, preferably bonded to the vamp and/or a quarter of a shoe.

In an embodiment of the invention, the lamination comprises a temperature of at least 170 Celsius degrees.

In an embodiment of the invention, the attachment forces between the leather base layer (LBL) and the leather attachment layer (LAL) is at least 5 kN/m, more typically above 10 kN/m, or even above 15 kN/m.

In an embodiment of the invention, the attachment forces between the leather base layer (LBL) and the leather attachment layer (LAL) is at least 5 kN/m, more typically above 10 kN/m, or even above 15 kN/m when measured according to ISO 3376:2011.

The attachment forces, the ultimate tensile strength expressed in kN/m is the pulling force required to break a 1 m wide sample of the material. A suitable test for measuring the ultimate tensile strength of the reinforcing fabric is ISO 3376:2011. An alternative test specifically adapted for testing tensile properties of polymer matrix composites which could be used is ASTM D3039.

In an embodiment of the invention, leather layers comprising a laminated base layer (LBL) glued to a leather attachment layer (LAL) has a water vapor permeability of above 5 mg/cm2/hour, such as above 8 mg/cm2/hour, such as above 10 mg/cm2/hour and wherein the breathability is measured according to SATRA TM 172.

In an embodiment of the invention, the variation of breathability of the leather layers varies with less than 25% measured over plurality of leather layers.

An important advantage of using adhesive in the form of e.g. a foil or web compared to e.g. a spread glue or a spread hot melted glue is a that the water vapor permeability/breathability of the leather may be obtained. A further advantage is less variation of the breathability of the leather throughout the treated leather pieces.

A further advantage of using an adhesive web is that the softness of the leather is kept even after an adhesive is applied. Other types of glue often result in hardness of the product after it has been pasted. It is therefore highly important to optimize and choose the right adhesive.

In an embodiment of the invention, the method is performed by in an automatic footwear processing arrangement (AFPA) having an input (I) and an output (0), wherein the method of providing the leather base layer (LBL) and the leather attachment layer (LAL) is performed in an automatic process transporting the leather base layer (LBL) and the leather attachment layer (LAL) from the input (I) and stacking these, one layer at least partially overlapping the other layer and wherein the activation is performed automatically by means of an automatic adhesive activation arrangement (AAA) and wherein the process of forcing the leather base layer (LBL) and the leather attachment layer (LAL) against each other under a pressure P with the adhesive between them is performed by an automatic pressure activation arrangement (APA).

In an embodiment of the invention, the process of curing the adhesive (A) is performed subsequent to activation by means of an automatic curing arrangement (ACA).

In an embodiment of the invention, the process of curing the adhesive (A) is performed subsequent to activation by means of an automatic cooling arrangement (ACOA).

In an embodiment of the invention, the adhesive to be activated is pre-adhered to the leather base layer (LBL) and/or the leather attachment layer (LAL)

In an embodiment of the invention, two or more input footwear parts, i.e. at least a leather base layer LBL and a leather attachment layer LAL are automatically stacked to be at least partly overlapping by an automatic stacking arrangement (ASA).

In an embodiment of the invention, footwear parts, i.e. at least a leather base layer LBL and a leather attachment layer LAL, are automatically cleaned/removal of dust/preprocessed prior to reactivation of adhesive already present on the leather footwear parts and/or prior to the application of adhesive to the footwear parts by means of a pre-adhesion processing arrangement (PAPA)

In an embodiment of the invention, the leather base layer (LBL) and/or the leather attachment layer (LAL) are automatically provided by a leather cutting arrangement (LCA).

In an embodiment of the invention, the leather footwear part comprising a leather layer having a top-grain side and a flesh side, the flesh side or the top-grain side comprising an adhesive bonded to the pre-glued leather part by hot-melting.

In an embodiment of the invention, the thickness of the leather footwear part is below 1.5 mm, such as below 1.2 mm.

In an embodiment of the invention, the thickness of the leather footwear part is within the range of 0.3 mm to 1.5 mm.

In an embodiment of the invention, the pre-glued leather footwear part at the glue-side is attached temporarily to a paper, a sheet or a foil.

When attaching the glue side of the pre-glued leather footwear part, it is possible to obtain a leather part which is ready for use in a footwear manufacturing line with a reduced risk of contamination of the glue-side of the pre-glued footwear leather part.

The paper or the foil is advantageously treated with a non-stick compound to ensure a peel-off immediately prior to adhering the leather footwear part to another leather layer, such as a vamp or a quarter.

In an embodiment of the invention, a footwear comprising a footwear upper (FU) attached to a sole (S), the footwear upper comprising
  at least one leather base layer (LBL) and
  at least one leather attachment layer (LAL),
    wherein the leather base layer (LBL) is glued to the leather attachment layer (LAL) with a hot-melt thermoplastic adhesive.

In an embodiment of the invention, a footwear comprising a footwear upper (FU) attached to a sole (S), the footwear upper comprising
  at least one leather base layer (LBL) having a base layer top grain surface and
  at least one leather attachment layer (LAL) having an attachment top grain surface and a flesh-side surface, wherein the leather base layer (LBL) is glued to the leather attachment layer (LAL) with the base layer top grain surface facing the flesh-side of the leather attachment layer (LAL).

This disclosure also describes an embodiment of a footwear the footwear as manufactured.

According to a further aspect, the invention relates to an automatic footwear processing arrangement (AFPA) having an input (I) and an output (0), wherein the method of providing the leather base layer (LBL) and the leather attachment layer (LAL) is performed in an automatic process transporting the leather base layer (LBL) and the leather attachment layer (LAL) from the input (I) and stacking these, one layer at least partially overlapping the other layer and wherein the activation is performed automatically by means of an automatic adhesive activation arrangement (AAA) and wherein the process of forcing the leather base layer (LBL) and the leather attachment layer (LAL) against each other under a pressure P with the adhesive between them is performed by an automatic pressure activation arrangement (APA).

It should be noted that the inventive manufacturing method includes the option of adhering as many parts of the footwear as possible and then e.g. supplementing with relatively few stitches in relation to some or a few of footwear parts. It should be noted that a relatively limited stitching may easily be applied within an automated manufacturing robot line as long as comprehensive and long continuous stitching is avoided or kept at a very low level.

It should be noted, although conventional stitching may advantageously be avoided within the scope of the invention, that the adhesion process in itself may be very advantageous as footwear-designs previously limited by the ability of conventional stitching setups, may now be made in an automated manner.

An automatic arrangement in the present context is e.g. referring to a unit or a number of automatically operated units working automatically at least between an input and an output of the arrangement. The transfer to the input(s) and from the output(s) may thus be implemented as manual, semi-automatic or automatic processes.

In an embodiment of the invention, the process of curing the adhesive (A) is performed subsequent to activation by means of an automatic curing arrangement (ACA).

In an embodiment of the invention, the process of curing the adhesive (A) is performed subsequent to activation by means of an automatic cooling arrangement (ACOA).

In an embodiment of the invention, the adhesive to be activated is pre-adhered to the leather base layer (LBL) and/or the leather attachment layer (LAL)

In an embodiment of the invention, two or more input footwear parts, i.e. at least a leather base layer LBL and a leather attachment layer LAL are automatically stacked to be at least partly overlapping by an automatic stacking arrangement (ASA).

In an embodiment of the invention, footwear parts, i.e. at least a leather base layer LBL and a leather attachment layer LAL, are automatically cleaned/removal of dust/preprocessed prior to reactivation of adhesive already present on the leather footwear parts and/or prior to the application of adhesive to the footwear parts by means of a pre-adhesion processing arrangement (PAPA).

In an embodiment of the invention, the leather base layer (LBL) and/or the leather attachment layer (LAL) are automatically provided by a leather cutting arrangement (LCA).

This disclosure also describes an embodiment of an automatic footwear processing arrangement.

In an embodiment of the invention, the leather of the leather base layer/leather attachment layer comprises tanning agents in the amount of 3 to 15% by weight of the leather.

In an embodiment of the invention, the leather base layer/leather attachment layer comprises tanning agents in the amount of 7 to 15% by weight of the leather and wherein the tanning agents are vegetable tanning agents.

In an embodiment of the invention, the vegetable tanning agents are obtained from chestnut wood, quebracho wood, tara pods, catechu, chinese gallnut, turkish gallnut, gambier, myrobalan, oakwook, sumac, bark from yate and/or valonia oak.

In an embodiment of the invention, the leather of the leather base layer/leather attachment layer comprises tanning agents in the amount of 3 to 12% by weight of the leather and wherein the tanning agents includes chrome tanning agents.

In an embodiment of the invention, the chrome tanning agents includes chromium, chromium salts and/or derivatives thereof.

In an embodiment of the invention, the leather base layer/leather attachment layer comprises chrome tanning agent(s) in the amount of 1 to 7% by weight of the leather, such as 2 to 6% by weight of the leather such as 2 to 5% by weight of the leather.

The specific content of chrome tanning in the amount of 1 to 7% by weight of the leather, such as 2 to 5% by weight of the leather is in particular attractive in relation to the inventive binding between two leather layers as this content of chrome in the leather of the bonded layers makes is possible to use heat-activated adhesive to attach the leather to the reinforcing fabric. It is moreover, and even more advantageous in applications where the leather has to be steamed e.g. for purposes of shaping etc.

In an embodiment of the invention, the chrome tanning agents includes chromium, chromium salts and/or derivatives thereof.

In an embodiment of the invention, the base layer top grain surface has been buffed.

In an embodiment of the invention, the leather base layer (LBL) and the leather attachment layer (LAL) comprises between 1 to 15% by weight of fatliquoring, such as between 1 to 10% by weight of fatliquoring.

In an embodiment of the invention, the base layer top grain surface comprises less than 5% by weight of fat, such as less than 4% by weight of fat, such as less than 3 by weight of fat.

The figures

The invention will be described in the following with reference to the drawings, where FIGS. 1A and 1B illustrate some principle parts of a footwear within the scope of the invention, FIG. 2 illustrates a backpiece and cross-section of a backpiece made within the scope of the invention, FIG. 3 illustrates a vamp and a toe cap and cross-section of a vamp and toe cap made within the scope of the invention, FIG. 4 illustrates a vamp and a tongue made within the scope of the invention, FIG. 5 illustrates a method of adhering or laminating an adhesive to a piece of leather made within the scope of the invention, FIG. 6 illustrates another method of adhering or laminating an adhesive to a piece of leather made within the scope of the invention, FIG. 7 illustrates a method of fixation of an adhesive to a piece of leather made within the scope of the invention, FIG. 8 illustrates a method of applying pressure made within the scope of the invention, FIG. 9 illustrates an automatic footwear processing arrangement and different stations to be applied within such as system, and FIG. 10a-c illustrate different embodiments of footwear processing equipment within the scope of the invention.

DETAILED DESCRIPTION

In terms of terminology, top grain surface is the upper portion or outer covering of the animal whereas split is the under layer which is removed by splitting operation in the leather making/tanning process.

Full grain refers to top grain leather where no sanding of the surface takes place. This leaves the original surface texture visible in the final leather, including hair follicles and any natural scar tissue or other skin defects. Additionally, any natural defects in the hide remain in the final piece, which can create natural lines of weakness that render the leather difficult to use in certain applications. For instance, in applications such as shoes, the natural weaknesses may cause the leather to preferentially bend in the wrong place, making the shoe uncomfortable during use.

Nubuck leathers have the surface layer removed or modified typically by a buffing process. Although the leather still has the pronounced network of natural fibres and corium structure giving the leather strength, the very top grain surface is effectively removed.

The buffing process used to form nubuck leathers leaves protein fibres that produce a velvet-like feel. Artificially embossing nubuck leather can create a surface texture, but often the embossing step damages the protein fibres and undermines the velvet-like feel.

Split leather is created from the fibrous part of the hide left once the top-grain has been separated from the hide, e.g. to be used as full grain or top grain leather. Split grain leather may have reduced strength as compared to comparable thicknesses of top grain leather, as the fibres tend to be more aligned. To compensate for this, split leather may need to be reinforced prior to use. Any grain texture is furthermore embossed on to the final leather.

Only full grain leathers maintain the natural grain and inherent strength of the original hide. When the sample thickness of full grain leather is reduced, the strength drops dramatically rendering them unsuitable for certain uses. Corrected grain and split leathers lack a natural grain. In order to attain a high quality appearance of natural full grain leather, they typically have an artificial grain embossed onto their surface.

FIG. 1 illustrates an exemplary footwear which may be made within the scope of the invention.

The exemplified footwear is a shoe 100. The illustrated shoe 100 comprises an upper part UP comprising a front part (FP) and back part (BP). The front part comprises footwear defining parts such as a vamp 101 and tongue 102, two quarters 103 and a toe cap 104.

The illustrated shoe 100 comprises a backpiece BP. The backpiece comprises footwear defining parts such as an outer counter 106, eyelets 107, and facing 108.

The illustrated shoe 100 may preferably comprise a lining on the inner side of the quarter. For illustrative purposes the lining is not shown.

The illustrated backpiece BP may comprise stitches to facilitate a curvature of the backpiece. The stitches are not illustrated on the figure.

The front part FP and backpiece BP are attached to each other where the backpiece BP is overlapping the front part FP. The attachment of the two parts FP to the BP may be facilitated e.g. by adhesion facilitated with conventional glue or other adhesives suitable for adhering the two pieces. The attachment of the two parts FP to the BP may also, either alone or in combination with adhesives, be facilitated with stitching.

The upper part UP is attached to a sole S e.g. by adhesion, gluing, stitching, injection molding or any relevant methods of attaching a sole. The attachment of the upper part UP to the sole may be done before or after the two pieces of front part FP and backpieces BP are attached to each other.

The sole may comprise several parts and layers (not shown).

The shoe may of course comprise other not-shown features and parts and the shapes and configuration of the parts may be different. Most shoes comprise more than 15 or 20 shoe defining parts.

FIG. 1B illustrates an alternative footwear within the scope of the invention in the form of a boot comprising, in simple terms, a vamp 1010 and a shaft 1030. Multiple distinct leather pieces 1040 has been bonded to the vamp 1010 and the shaft 1030 by means of glue. The vamp 1010 and the shaft 1030 is forming a leather base layer and the leather pieces 1040 forms a number of leather attachment layers bonded to the leather base layer(s) with little or no stitching FIG. 2A illustrates a top view of parts of a backpiece e.g. of the shoe of FIG. 1, comprising an outer counter 202, two quarter pieces 201A and 201B and two facing pieces 202A and 202B.

FIG. 2B illustrates cross-sections of the parts of a backpiece illustrated in FIG. 2A the transverse direction, i.e. cross sections of the outer counter 202, two quarter pieces 201A and 201B and two facing pieces 202A and 202B.

FIG. 2C illustrates a top view of an assembled backpiece e.g. of the backpieces illustrated in FIG. 2A, comprising an outer counter 202, two quarter pieces 201A and 201B and two facing pieces 202A and 202B. The two quarter pieces thereby forming a leather base layer (LBL) and the outer counter and the two facing pieces thereby forming a leather attachment layers (LAL). The assembly of the pieces may be facilitated by a preliminary or permanent adhering of the pieces together e.g. by adhesive.

FIG. 2D illustrate a cross-section of the assembled backpiece as illustrated in FIG. 2C as illustrated in the transverse direction. The back piece comprises an outer counter 202, two quarter pieces 201A and 201B and two facing pieces 202A and 202B.

The outer counter 202 is bonded to the two quarter pieces 201A and 201B by an adhesive (A) layer 203 and the two facing pieces 202A and 202Bs are connected to the two quarter pieces 201A and 201B by layers of adhesives 203A and 203B respectively.

In the illustrated back-piece provided according to an embodiment of the invention, the two quarter pieces 201A and 201B forms a leather base layer(s) LBL upon which two facing pieces 202A, 202B and the outer counter 202 are bonded by means of glue. The two facing pieces 202A, 202B and the outer counter 202 may elsewhere be referred to as leather attachment layers LAL.

In the presently illustrated embodiment, the leather forming the base layer(s) are top grain leather, buffed or nonbuffed, with the top-grain side facing towards the leather attachment layers LAL, the two facing pieces 202A, 202B and the outer counter 202.

The present illustrated leather attachment layers LAL are preferably from top grain leather also, having the flesh-side facing the leather base layer(s) LBL, here the two quarter pieces 201A and 201B and the top grain side facing to the exterior of the final shoe.

Possible adhesives are described elsewhere in the application, but in the present embodiment a co-polyamide has been applied.

The adhesive may be present in a continuous layer or be present as a "perforated" or non-continues adhesive layer facilitating both sufficient bonding but also breathing or some kind of moisture transport through the layers.

FIG. 3A illustrates a top view of parts of an upper e.g. of the shoe of FIG. 1, comprising a vamp 301 and a toe cap 303 made within the scope of the invention. The two pieces, vamp 301 and toe cap 303 are assembled by fitting the toe cap 303 on top of the vamp 301 as illustrated and then attached together by adhesive (A). The vamp thereby forms a leather base layer (LBL) and the toe cap forms a leather attachment layer (LAL).

FIG. 3B illustrates a cross-section of the above parts of an upper e.g. of the shoe of FIG. 1 illustrated in a transverse direction of a vamp 301 and toe cap 303. The toe cap 303 is connected to a layer of adhesive 302 and then connected to the vamp 301.

Figure 1A:
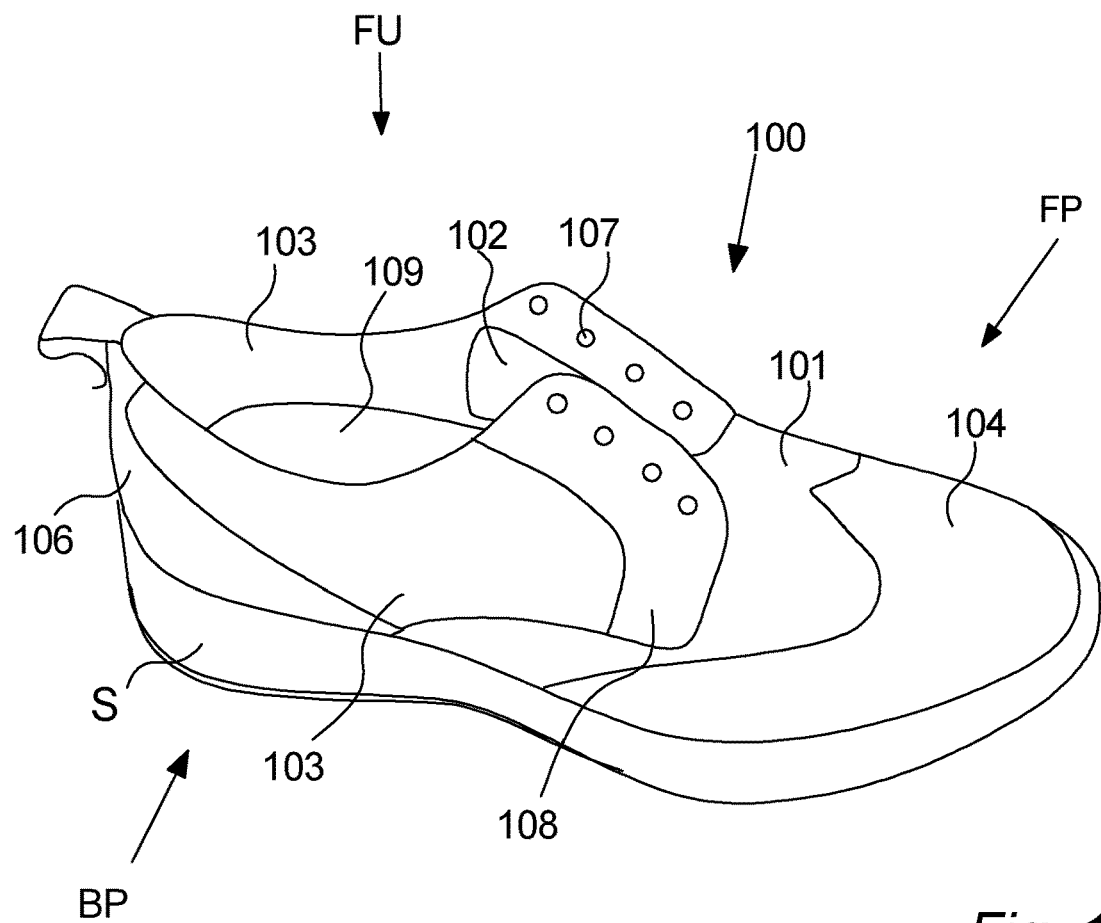
Figure 1B:
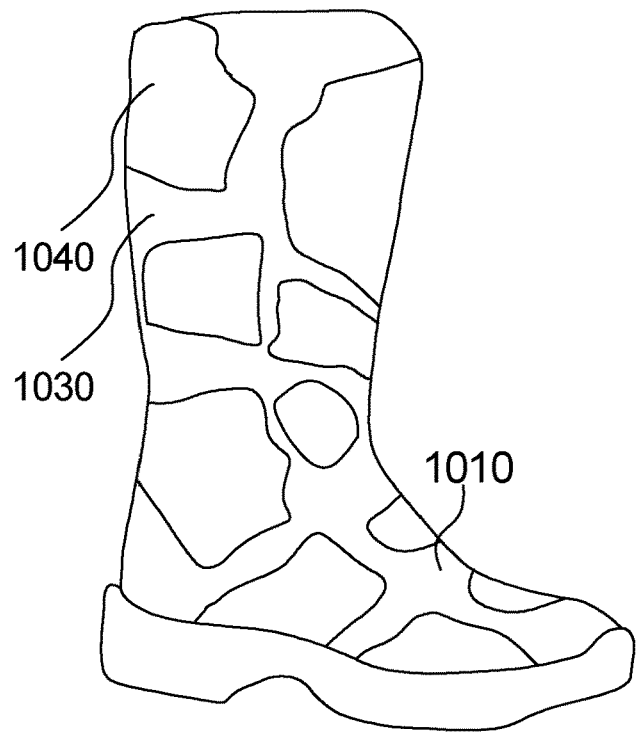
Figure 2A:
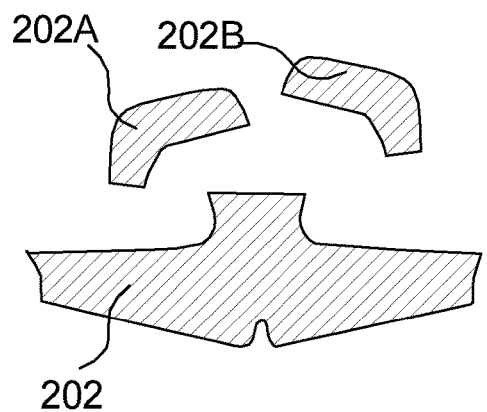
as illustrated in FIG. 2 (202, 202A, 202B) and FIG. 3 (303) with an adhesive as illustrated in FIG. 2 (203, 203A, 203B) and FIG. 3 (302).
Figure 2A:
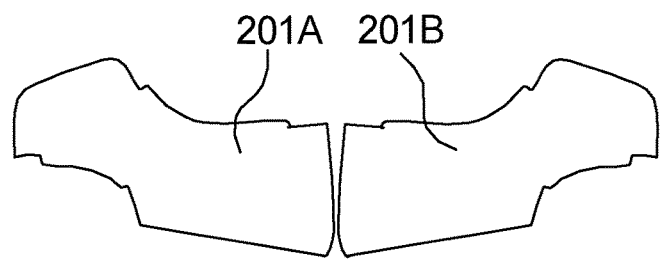
Figure 2B:
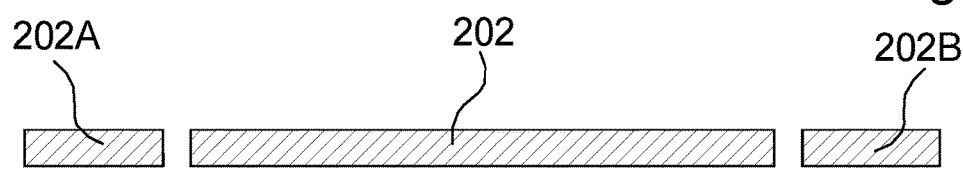
Figure 2C:
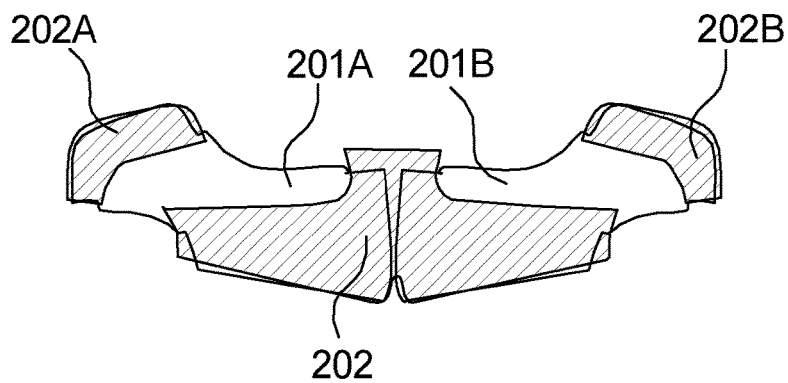
Figure 2D:
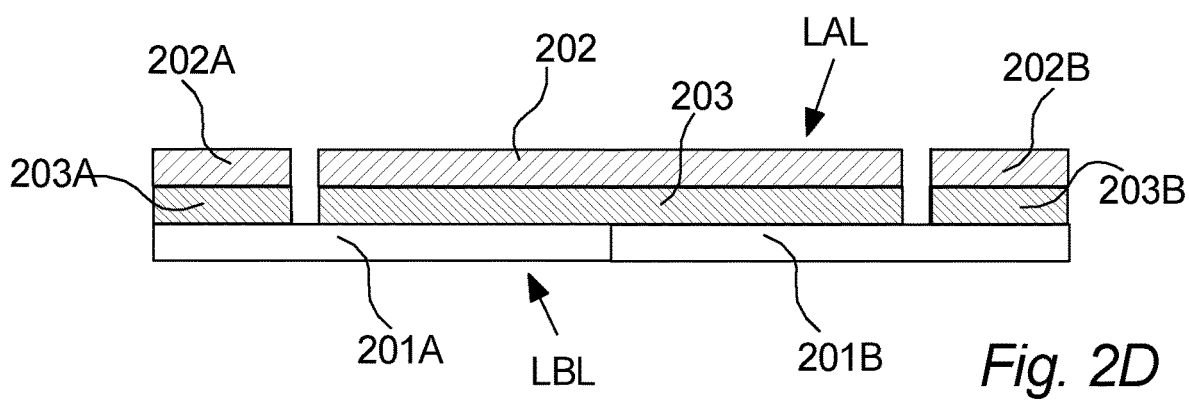
Figure 3A:
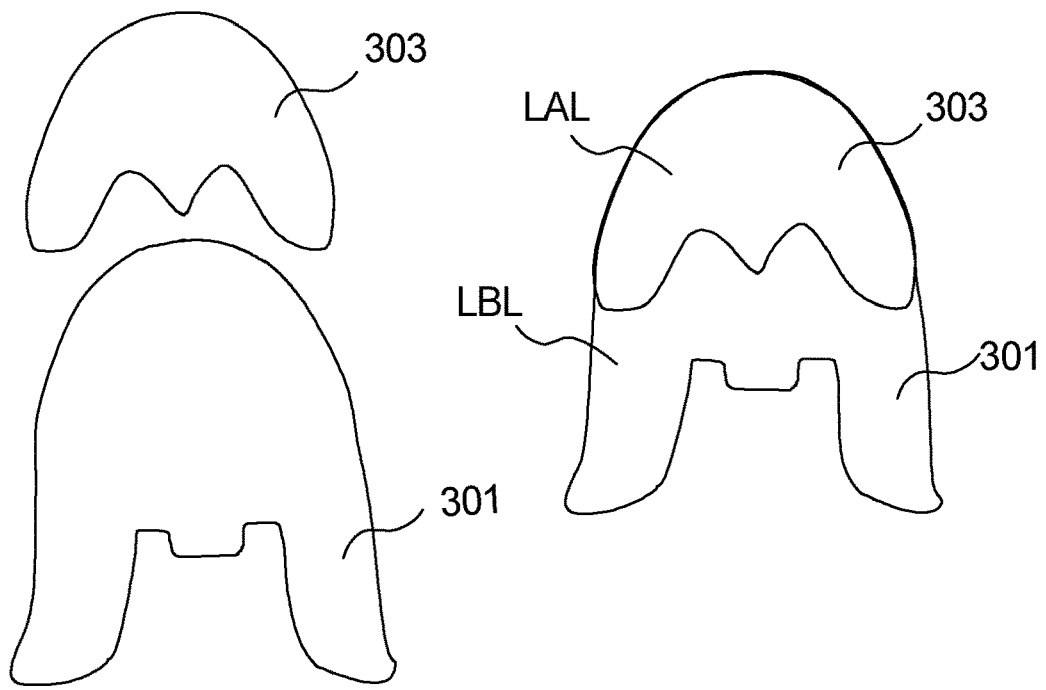
Figure 3B:
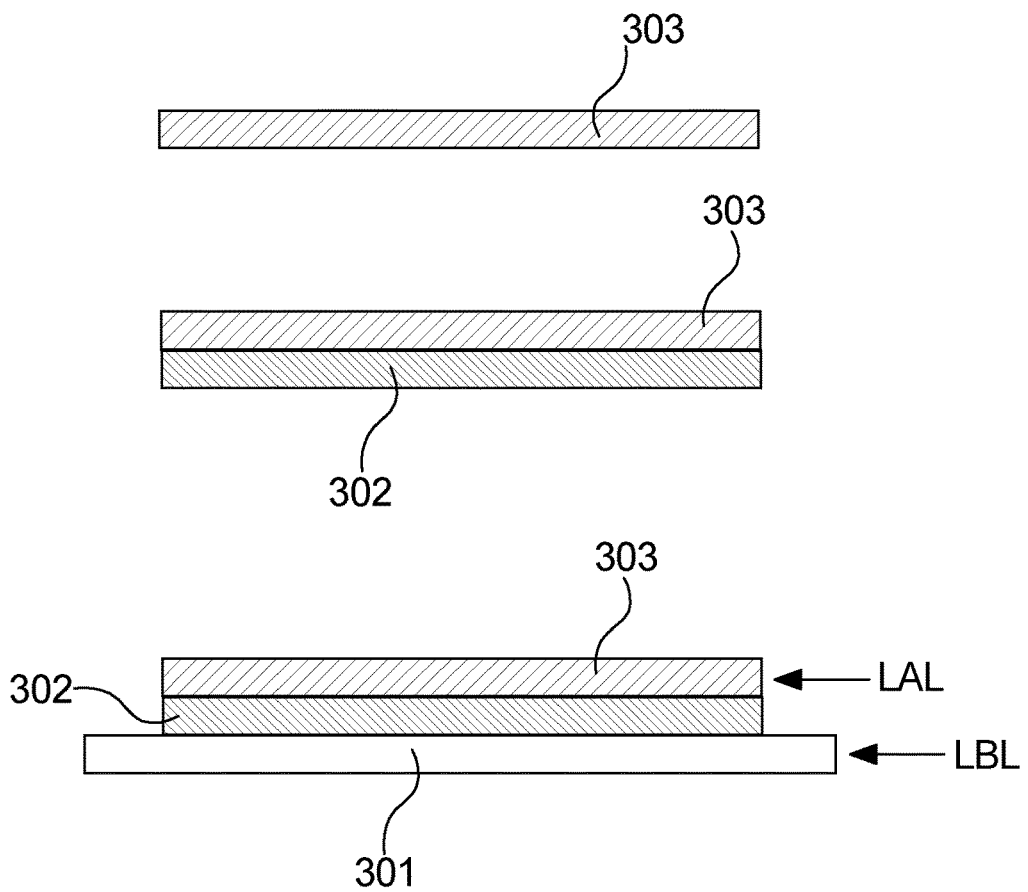
Figure 4:
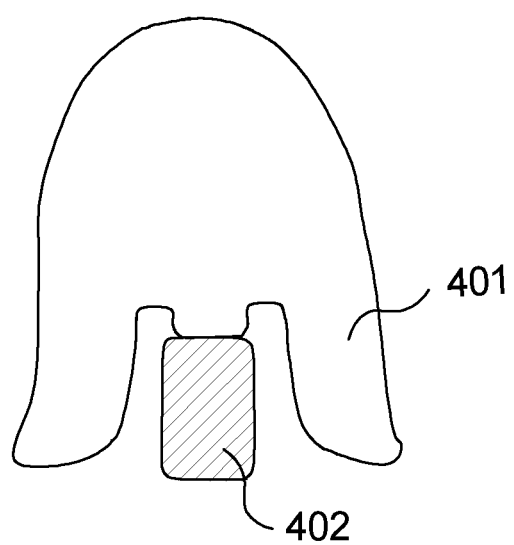
FIG. 4 illustrates a top view of parts of an upper e.g. of the shoe of FIG. 1, comprising a vamp 401 and tongue 402 made within the scope of the invention.
Figure 5A:
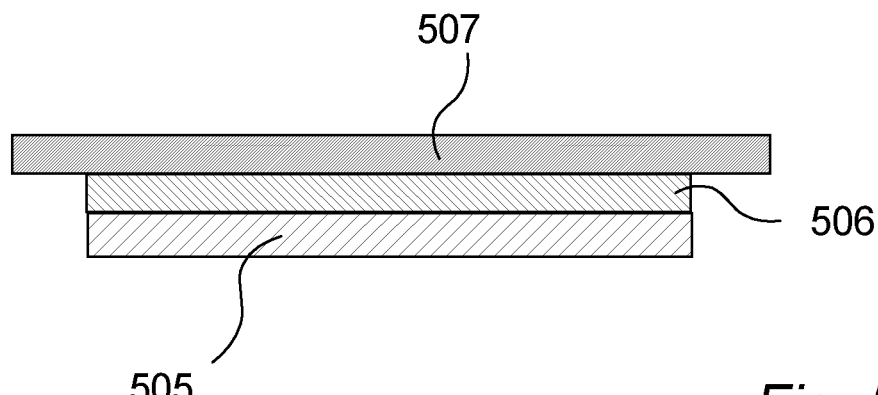
FIG. 5A illustrates a cross-section of an assembly according to an example of a method for pre-laminating a leather piece 505 e.g.

FIG. 5A thus shows a leather piece 505, a layer of adhesive, e.g. a web or a foil of non-melted thermoplastic hot-melt adhesive and a Teflon sheet 507.

Figure 5B:
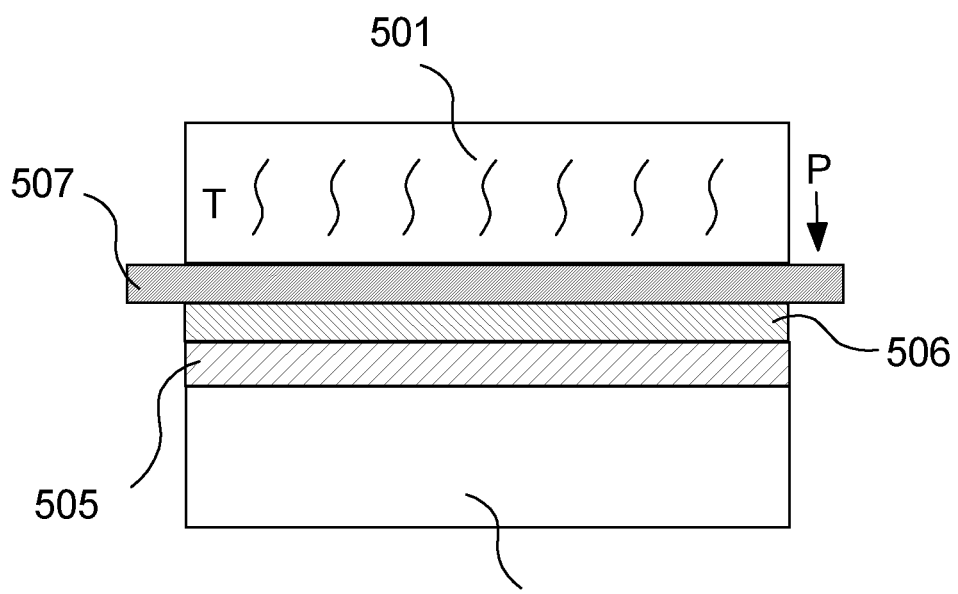

With reference to FIG. 5A, FIG. 5B illustrates a cross-section of an example of adhering the adhesive 506 to a leather piece 505. The leather piece 505, adhesive 506 and Teflon sheet 507 are subjected to first compression part 501 from one side and a second compression part 502 from the opposite side and application of heat T from at least one side of the compression parts 501 or 502 in combination with pressure P. In the present embodiment, heat is only actively transferred from the first compression part 501.

The application of adhesive to the leather parts may be processed with one leather part at the time but for industrial applications it may be preferably to pre-laminate several pieces of leather in the same process.

The two compression parts 501 and 501 may be parts on a machine e.g. a machine such as a transfer flatbed pressing machine such as a Galaxy Air Double but could also be any other machine or apparatus capable of applying the relevant temperature and pressure.

Figure 5C:
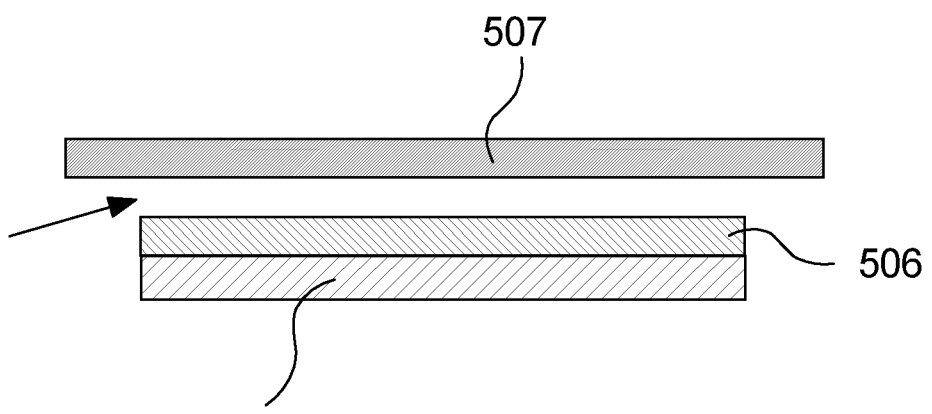

FIG. 5C illustrates a cross-section of an example of detaching Teflon sheet 507 from the adhesive 506 that is attached to the leather 505.

The Teflon sheet is only slightly attached to the adhesive side of the leather. Immediately after detachment of the Teflon sheet from the adhesive side of the leather, the adhesive is functioning for further procedures such as adhering two pieces of leather together. For industrial applications it may be advantageous to cover the prelaminated leather with a sheet of paper e.g. a heat resistant paper PA that removably adhere and cover the prelaminated leather for optimal transportation of the pieces and for avoidance of contamination.

The detachment of the Teflon sheet may be done manually or could also be an automatized non-manually process.

Subsequently to the prelamination, the leather pieces may be re-cut depending on the subsequent processes and applications.

Figure 5D:
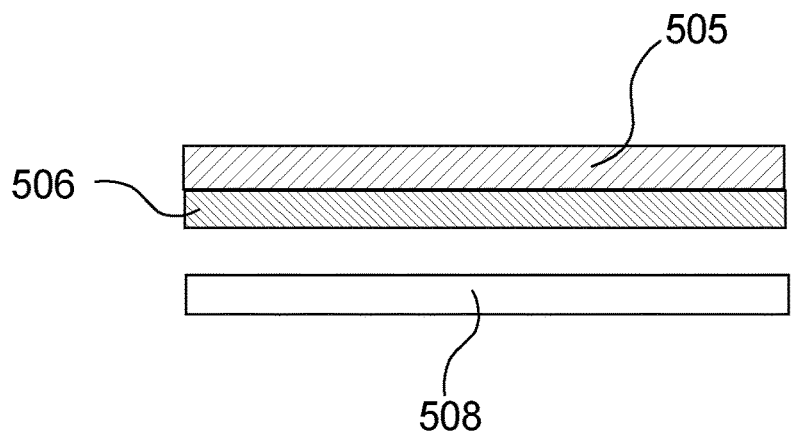
Figure 5E:
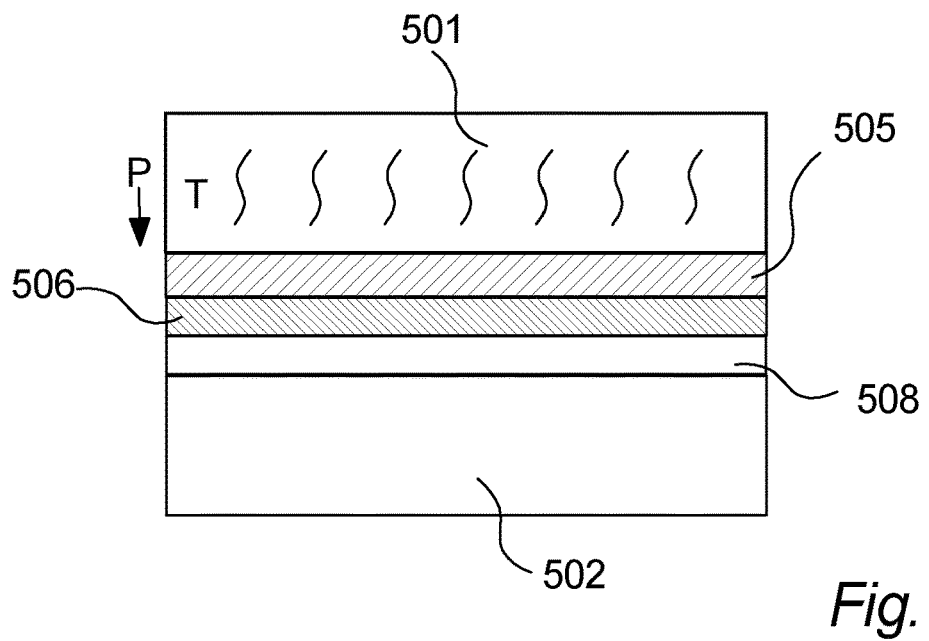

FIGS. 5D and 5E illustrate a cross-section of an example of adhering a prelaminated leather 505 with adhesive 506 to another piece of leather 508. The prelaminated leather 506 could e.g. be a facing piece 202A and the other piece of leather 508 could e.g. be a quarter piece 201A as illustrated in FIG. 2.

The adherence of the leather parts may be processed with adhering one leather piece to another leather piece at the time but for industrial applications it may be preferably to adhere several pieces of leather in the same process.

In the process it might be advantageous to use of sheet of paper PA e.g. a heat resistant paper between the leather and compression parts. This is not shown.

The two compression parts 501 and 501 may be parts on a machine e.g. a machine such as a transfer flatbed pressing machine such as a Galaxy Air Double but could also be any other machine or apparatus capable of applying the relevant temperature and pressure.

The leather piece 505, adhesive 506 and leather piece 508 are pressed by a compression part 501 from one side and a compression part 502 from the opposite side and during application of heat T and pressure P from at least one side of the compression parts 501 or 502.

Figure 5F:
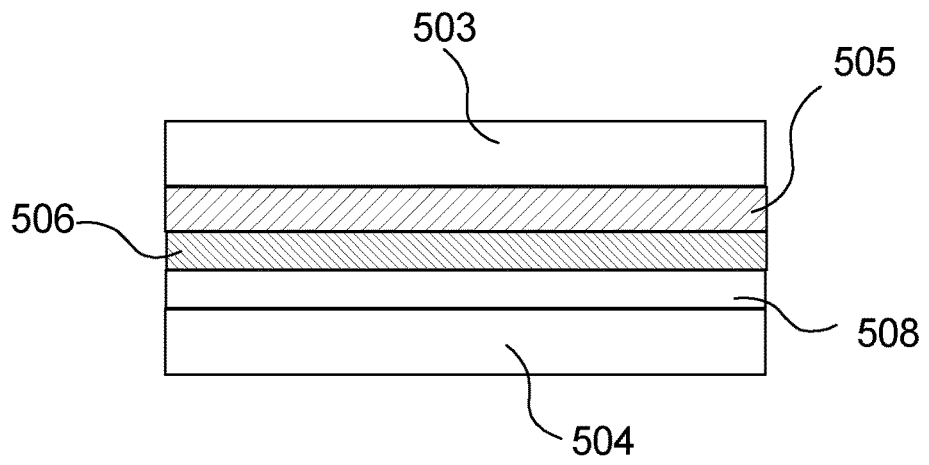

FIG. 5F illustrates a cross-section of an example of cooling the attached leather pieces 505 and 508 by pressing the attached and partly bonded leather pieces to a compression part 503 and 504 to facilitate a cooling process of the leather pieces 505 and 508. The cooling process may be a passive or active process. An example of a machine to facilitate a cooling process could be a reinforcement press machine. The cooling process, active or passive, is important for the strong binding of the leather pieces adhered within the scope of the invention as the leather pieces must be mutually fixed during the cooling.

Figure 6A:
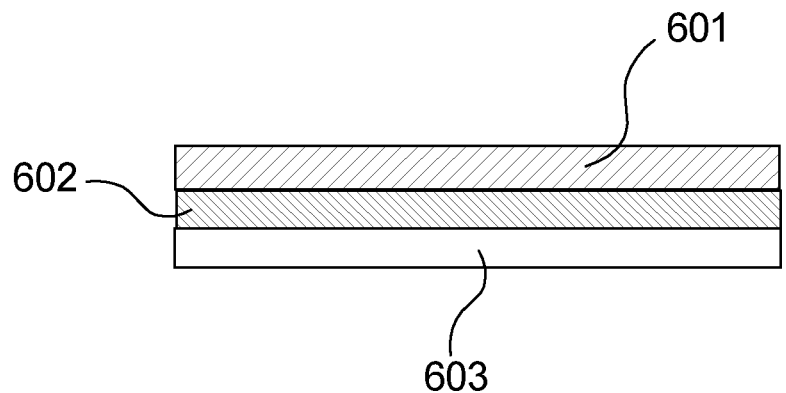
Figure 6B:
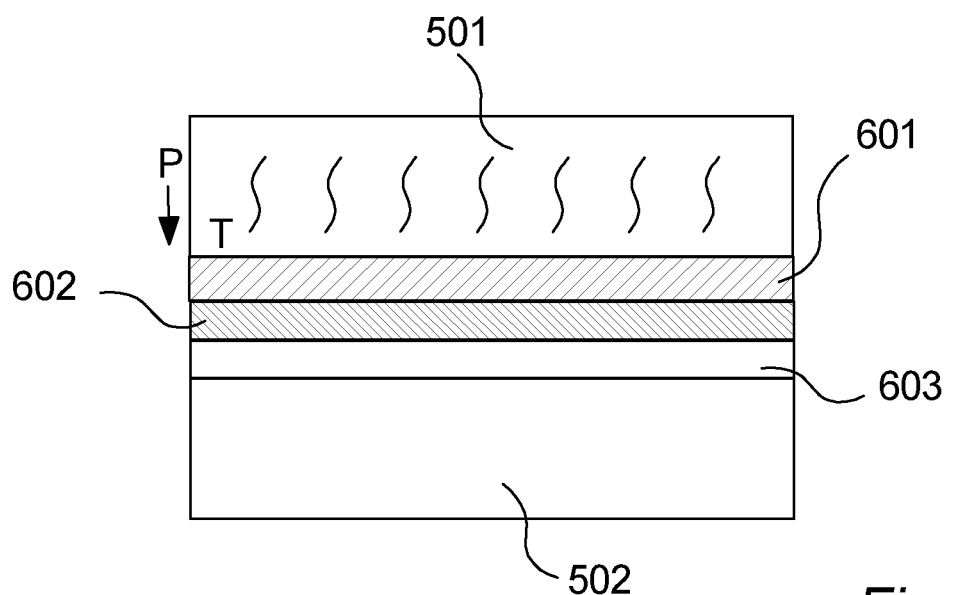

FIGS. 6A and 6B illustrate a cross-section of an example of adhering two leather pieces 601 and 603 together facilitated by adhesive 602 without prelamination. All three layers; one leather piece 601, an adhesive 602 and another leather piece 603 are fixed mutually and fitted together and subjected to a compression part 501 from one side and a compression part 502 from the opposite side and application of heat T and pressure P from at least one side of the compression parts 501 or 502 to hot-melt the adhesive 602. A subsequent cooling during maintaining of the fixation of the two leather pieces.

An advantage of not using pre-laminated leather could be that it is only necessary to heat the leather once which may be industrial beneficial, but it may also be an advantage in order to avoid shrinkage of the leather and for keeping the softness of the leather.

A following process should preferably include a cooling process e.g. as illustrated in FIG. 5F, but this is not shown here.

Figure 7:
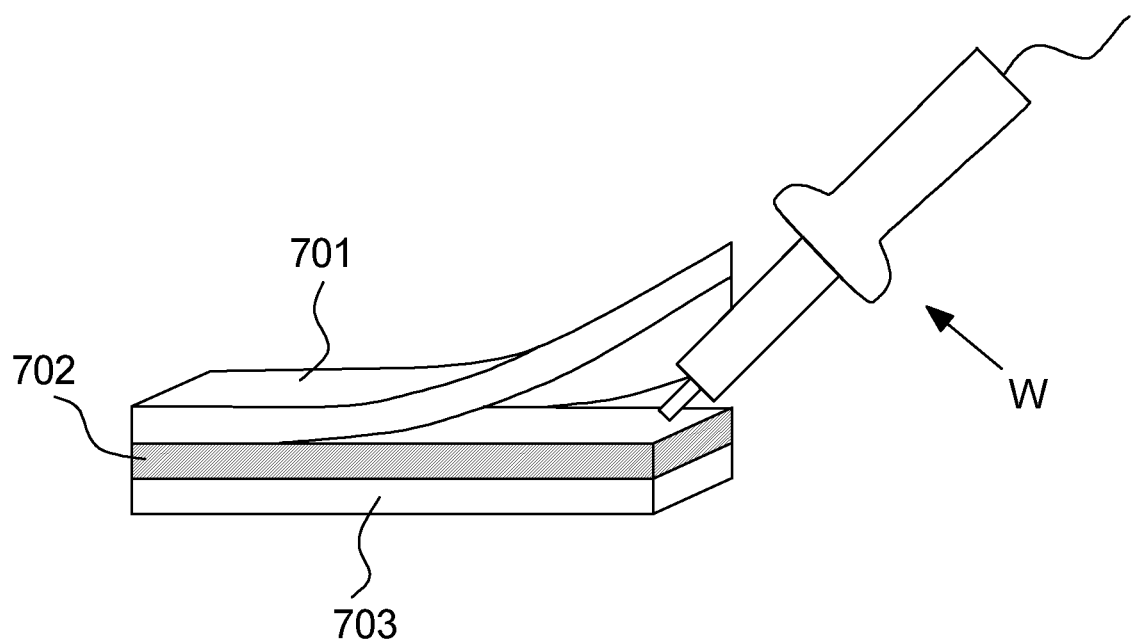

FIG. 7 illustrates a cross-section of an initial fixation of an adhesive 702 to a leather piece 701. The adhesive 702 may have been prelaminated to another leather piece 703 prior to the fixation. The adhesive 702 may also not have been laminated to the other piece of leather 703 and instead fixated by the method illustrated for the adhesive 702 and the leather piece 701.

The fixation may be done by using a e.g. welding iron W by dot point welding uniformly around the piece of adhesive 702 to secure adhesive to leather for pre-pressing operation.

The fixation may be done by use of other devises or methods suitable to fix the adhesive 702 to the leather pieces 701 and/or 703.

Other types of pre-fixation, e.g. mechanical or chemical, may be applied within the scope of the invention.

Figure 8:
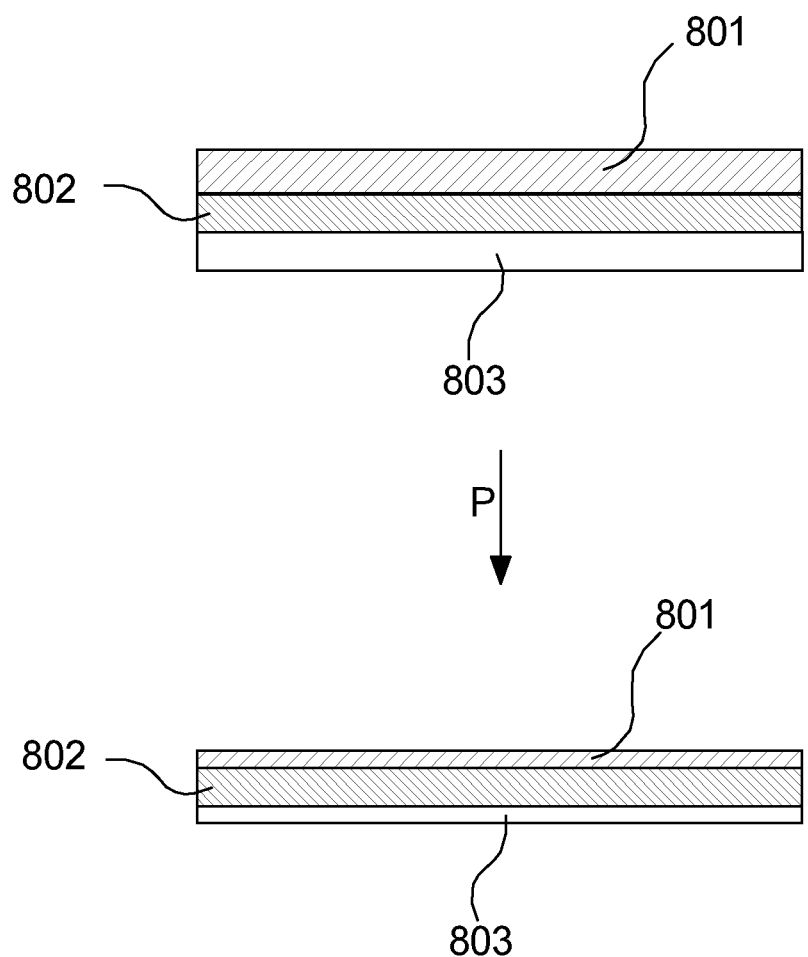

FIG. 8 illustrates an example of applying pressure P to a stack of leather comprising a leather piece 801, adhesive 802, and another leather piece 803 respectively. The stack is illustrated as a cross-section. Applying pressure P to the stack may result in a compression of at least one piece of leather.

Applying pressure to a stack of a leather where the adhesive is in between two leather pieces may result in removal of pockets of air that might be present in the leather.

Removal of the air pockets may lead to a greater heat transportation of the leather and therefore less heat may be required to heat up the adhesive through the leather.

The exemplified footwear is a shoe. Other types of footwear may be relevant within the scope of the invention, such as a boot. It should also be noted that shoes may be configured or manufactured in many different ways and be formed of different types of shoe-defining parts but still considered included in the invention as long as principle parts of the shoe, are made according to the provisions of the invention. Further, it should be noted that there may be different nomenclature of the different parts of the shoe e.g. toe cap may also be termed as mud gourd etc. and the exemplary footwear parts, made within the scope of the invention, also includes synonyms of the shoe parts.

The adhesive illustrated in the above description e.g. as 203, 302, 506, 602, 702, and 802 may preferably be applied as an adhesive foil, film, slit film, web, dots, or net with various degrees of openness to ensure optimal bonding and high breathability of the footwear. The pattern of the adhesive is preferably an open, permeable or flexible application The term prelamination refers to the process of applying an adhesive to a piece of leather and the term lamination refers to applying a piece of leather to the prelaminated leather facing the side with the adhesive.

Overall, prelamination, lamination, adhering and gluing may all relate to applying an adhesive to at least one leather piece ending up with the adherence of two leather pieces.

The adhesive may most preferably be a thermoplastic co-polyamide web.

The thermoplastic co-polyamide web may e.g. have a DSC melting range between 98 to 145 and DSC onset at between 96 and 115 Celsius degrees according to ISO 11357.

A possible DSC melting range for an applied co-polyamide hot-melt glue could e.g. be 98 to 110 degrees Celsius. This would ensure a robustness to steam treatment during manufacture but also ensure that the leather attachment layers are securely fastened to the footwear when the footwear is subjected to stress, temperature and humidity under ambient conditions A further possible DSC melting range for an applied hot-melt glue could e.g. be 132 to 148 degrees Celsius. This would ensure a robustness to steam treatment during manufacture but also ensure that the leather attachment layers are securely fastened to the footwear when the footwear is subjected to stress, temperature and humidity under ambient conditions. The melting point of these adhesive may thus be different and the applied heat (temperature) and duration of heating (time) must be chosen to melt the chosen adhesive without damaging or drying the leather layer(s) too much. Other parameters to be considered when heating includes e.g. thickness of the leather and the pressure during the process.

Advantages of using a non-woven thermoplastic co-polyamide web are that it maintains a high softness, flexibility and breathability of the material. Further, the application of the thermoplastic co-polyamide web is industrial applicable, easy to unroll and process with no air entrapment during lamination.

The adhesive foil may be cut into relevant pieces depending on application by suitable cutting tools prior to lamination or adherence to leather. The adhesive foil may also be applied to leather prior to cutting the adhesive foil into suitable pieces.

The heating of the adhesive thermoplastic co-polyamide web during prelamination may preferably be made by heating the web through a heat resistant paper from at least one heating element. The temperature from the heating element may be at least 100 Celsius degrees, more preferably at least 140 Celsius and most preferably at least 160 Celsius degrees. Preferably, the temperature during manufacture should not exceed 200 degrees Celsius.

The heating of the thermoplastic co-polyamide web during lamination of two leather pieces may preferably by made by heating the web through a leather piece directly linked to the web and another leather piece. The temperature from the heating element may be at least 100 Celsius degrees, more preferably at least 140 Celsius or at least 170 Celsius degrees.

The temperature applied to the leather may be different from temperature at the site of the thermoplastic co-polyamide web and several parameters can influence the differences between these temperatures. Such parameters could be the type of leather or pre-treatment of the leather, thickness of the leather, pressure during lamination and the time where the temperature and pressure are applied to the leather.

The temperature of both the leather side and the thermoplastic co-polyamide web are preferably controlled by e.g. a strip that indicate temperature to make sure that the correct temperature reaches the leather and thermoplastic co-polyamide web to ensure an optimal and strong binding.

The heating may be applied from only one side through one leather piece but may also be applied through both sides of the two leather pieces.

During pre-lamination, a heat resistant element, such as Teflon, e.g. a Teflon sheet 507 as illustrated in FIG. 5A-C, may be used between the heating part and the adhesive. The heat resistant element may be an individual component but may also be an integrated part of an apparatus.

The duration or time of heating may greatly affect the adherence og the thermoplastic co-polyamide web to the leather and the time may be different during the steps of prelamination and lamination. During prelamination the time may preferably be less than the time during lamination. The time of heating may preferably be at least 3 sec. during prelamination and preferably at least 30 sec. during lamination. The time of heating may be changed according to different parameters such as the type of leather or pre-treatment of the leather, thickness of the leather and pressure applied during the process.

The temperature applied during heating during pressure may depend on the type of hot-melt glue applied. If hot-melt glue with lower melting temperature than e.g. 130 degrees Celsius, the heating temperature may be lowered correspondingly, The pressure applied to the leather and adhesive during the process may increase the thermal conductivity through the leather and thereby improve the heat transfer. Improving the heat transfer thorough the leather may influence how high temperature that needs to be applied to the leather in order to reach the melting temperature of the thermoplastic co-polyamide web.

The pressure applied during heating may vary depending on application, but the pressure should at least be 2 bar or above, such as at least 3 bar or above, such as at least 4 bar and above.

The step of cooling the hot-melted glue actively or passively should preferably be done under elevated pressure, enough to both fixate the bonded/gradually bonding leather layers and also ensure that the glue is kept within the non-woven fiber structures of the leather layers to the widest degree possible. Elevated temperature may be e.g. 1 bar, but it also makes sense to apply a pressure comparable to the pressure applied through heating.

It should be noted that the pressure applied during cooling may advantageously be applied in another machine than the machine applied during pressure and heating.

Leather pieces illustrated in the above description e.g. as exemplified in FIG. 5 as 505 may be any type of leather. Preferably the leather type is carefully selected based on its properties and chemicals used e.g. in pre-treatment of the leather e.g. during the tanning process.

Leather types that may be useful within the scope of the invention are types such as Examples of leather types that may be used within the scope of invention may be types such as full grain or top grain leather, embossed grain leather, suede and nubuck.

Leather pieces may be cut out to relevant pieces depending on application by suitable cutting tools prior to lamination or adherence to adhesive. The leather may also be laminated or applied an adhesive prior to cutting the leather into suitable pieces.

The invention has been exemplified above with reference to specific examples of the parts of the shoe and methods of adhering parts of the shoe. However, it should be understood that the invention is not limited to the particular examples described above but may be designed and altered in a multitude of varies within the scope of the invention as specified in the claims.

In principle, the method may be carried out with any type of leather. However, typically the leather will have already been tanned and post tanned. Tanning and post tanning of leather is well known in the art and need not be described in detail here.

Any type of tanned leather may be used, including metal tanned (e.g. using chromium, aluminum, zirconium, titanium, iron or combinations thereof), vegetable tanned (e.g. using tannins from bark or other sources), or natural tanning. Typically, the leather is tanned with chrome or vegetable tanned, with chrome tanned leather being most often used.

In principle, there is no upper limit to the thickness of the leather used in the method. However, the reinforcing fabric provides strength to the laminate formed by the method, so the leather need not be overly thick. Moreover, if the leather is too thin, the adhesive can penetrate the entire thickness of the leather, fixing it and thus preventing the surface texture from developing during milling. Consequently, the leather is typically from 0.1 to 4 mm thick, more typically from 0.2 to 3.2 mm thick, or even 0.3 to 2 mm thick.

An advantage of the laminate is very thin leathers can be used which retain the unique surface texture obtainable by the method of the disclosure, are lightweight and flexible yet strong due to the reinforcing fabric. The laminates formed from thinner leathers are therefore particularly desirable.

Thinner leathers that are typically used include from 0.3 to 1.6 mm, or 0.3 to 1.2 mm, or even 0.3 to 0.9 mm, with 0.4 to 0.8 mm being the most preferred.

The method disclosed herein is most advantageous with thinner leathers, as the unique surface texture may be formed to provide very soft and supple leather. However, the leather is still very high strength due to the reinforcing layer, meaning that it can be used in a wide range of products.

Leather is a natural product that inevitably varies in thickness to some degree. Typically, the tolerated substance for a leather type is 0.2 mm, meaning that the sample thickness may vary by 0.2 mm over its area, such as 0.4-0.6 mm or 1.2-1.4 mm.

The thickness of leather can be calculated using Satra TM 1: 2004.

The thickness of a leather layer may e.g. be measured by a SATRA STD 483 "Thickness gauge for leather"

In principle, the leather can derive from any source, including cow hide, horse hide, goat skin, sheep skin, kangaroo hide and the like.

Leathers deriving from reptiles or fish have different surface properties on the skin side, and therefore develop a different surface texture during the method of the disclosure. Nevertheless, these types of leathers tend to have lower strengths (particularly fish leathers), and so can greatly benefit from being laminated to the reinforcing layer in accordance with the disclosure, to provide high strength laminates having unique surface textures.

Even so, preferably the leather is a mammal or marsupial leather (i.e. derives from a hide from a mammal such as a cow or horse, or a marsupial such as a kangaroo). Mammal leathers are most often used.

The method of the disclosure provides a characteristic and aesthetically pleasing surface texture to the second side of the leather. Typically, therefore the first side of the piece of leather is the flesh side, and the second side of the piece of leather is the skin side.

Desirably, the leather base layer and the leather attachment layers are top grain leather.

Tanning is used as the conventional ways of treating leather and may be applied to the invention. Depending on the compounds, the color and texture of the fabric may change. The technical definition of tanning is well known in the art, but briefly, according to Anthony D. Covington "Tanning Chemistry" chapter 10, the only strict definition of tanning is the conversion of a putrescible organic material into a stable material capable of resisting biochemical attack. Tanning involves a number of steps and reactions depending on the initial material and the final product.

In the case of collagen, it is the sidechains that largely define its reactivity and its ability to be modified by the stabilizing reactions of tanning when leather is made. In addition, the chemistry of the backbone, defined by the peptide links, offers different reaction sites that can be exploited in some tanning processes. During the tanning process, modification of collagen by the chemistry of the tanning agent(s) affects the different features of the properties of the material; The hydrophilic-hydrophobic balance of the leather may be markedly affected by the chemistry of the tanning agent by changing the relationship between the leather and the solvent, which in turn could affect the equilibrium of any reagent between the solvent and the substrate. Also, the site of reaction between the reagent and the collagen may affect the isoelectric point of the collagen and consequently there could be a different relationship between pH and charge on the leather. The lower the isoelectric point, the more anionic or less cationic the charge on the pelt may be at any pH value: the higher the isoelectric point, the more cationic or less anionic the charge on the pelt will be at any pH value. Further, the relative reactions at the sidechains and the backbone of the protein could possible determine the type of reaction and hence the degree of stability of the tannage: the fastness of the reagent may be influenced by the interaction between reagents and the substrate.

Hydrothermal stability as used herein could possibly be measured through the shrinkage temperature (Ts) of a hide. This is the temperature at which the energy input (heat) exceeds the energy bound in existing hydrogen bonding of the collagen structure resulting in the decomposition of the helical structure. The shrinkage temperature for untanned hides is generally around 65 degrees Celsius. The Ts may be increased through the process of tanning.

Chromium(III) sulfate ($[Cr(H2O)6]2(SO4)3$) has long been regarded as the most efficient and effective tanning agent. Chromium(III) compounds of the sort used in tanning are significantly less toxic than hexavalent chromium. Chromium(III) sulfate dissolves to give the hexaaquachromium (III) cation, $[Cr(H2O)6]3+$, which at higher pH undergoes processes called olation to give polychromium(III) compounds that are active in tanning being the cross-linking of the collagen subunits. The chemistry of $[Cr(H2O)6]3+$ is more complex in the tanning bath rather than in water due to the presence of a variety of ligands. Some ligands include the sulfate anion, the collagen's carboxyl groups, amine groups from the side chains of the amino acids, and masking agents. Masking agents are carboxylic acids, such as acetic acid, used to suppress formation of polychromium(III) chains. Masking agents allow the tanner to further increase the pH to increase collagen's reactivity without inhibiting the penetration of the chromium(III) complexes.

Collagen is characterized by a high content of glycine, proline, and hydroxyproline, usually in the repeat -gly-pro-hypro-gly-. These residues give rise to collagen's helical structure. Collagen's high content of hydroxyproline allows for significant cross-linking by hydrogen bonding within the helical structure. Ionized carboxyl groups (RCO2-) are formed by hydrolysis of the collagen by the action of hydroxide. This conversion occurs during the liming process, before introduction of the tanning agent (chromium salts). The ionized carboxyl groups coordinate as ligands to the chromium(III) centers of the oxo-hydroxide clusters.

Tanning increases the spacing between protein chains in collagen from 10 to 17 Å. The difference is consistent with cross-linking by polychromium species, of the sort arising from olation and oxolation.

One way of performing a tanning is explained in the following. Prior to the introduction of the basic chromium species in tanning, several steps are required to produce a tannable hide. The pH must be very acidic when the chromium is introduced to ensure that the chromium complexes are small enough to fit in between the fibers and residues of the collagen. Once the desired level of penetration of chrome into the substance is achieved, the pH of the material is raised again to facilitate the process. This step is known as basification. In the raw state, chrome-tanned skins are greyish-blue, so are referred to as wet blue. Chrome tanning is faster than vegetable tanning (less than a day for this part of the process) and produces a stretchable leather which is excellent for use in handbags and garments.

Subsequent to application of the chromium agent, the bath is treated with sodium bicarbonate to increase the pH to 4.0-4.3, which induces cross-linking between the chromium and the collagen. The pH increase is normally accompanied by a gradual temperature increase up to 40° C. Chromium's ability to form such stable bridged bonds explains why it is considered one of the most efficient tanning compounds. This efficiency is characterized by its increased hydrothermal stability of the skin, and its resistance to shrinkage in heated water.

The leather of a leather layer may typically comprise tanning agents in the amount of 3 to 12% by weight of the leather layer when the tanning agents includes chrome tanning agents.

The chrome tanning agents includes chromium, chromium salts and/or derivatives thereof.

The leather may as a further restriction in relation to the total content of tanning agent in the leather comprise chrome tanning agent(s) in the amount of 1 to 7% by weight of the leather, such as 2 to 6% by weight of the leather such as 2 to 5% by weight of the leather.

The specific content of chrome tanning in the amount of 1 to 7% by weight of the leather, such as 2 to 5% by weight of the leather is in particular attractive in relation to the inventive leather bonding as this content of chrome in the leather of the leather layers bonded makes is possible to use heat-activated adhesive to attach the leather to the reinforcing fabric. It is moreover, and even more advantageous in applications where the leather as to be steamed e.g. for purposes of shaping etc.

The chrome tanning agents includes chromium, chromium salts and/or derivatives thereof.

Fatliquoring refers to the process where fats/oils and waxes are fixed to the leather fibers. The primary function of fatliquoring is to prevent the fiber structure resticking during drying by providing an oil surface to the fiber structure. Any fatliquoring agents may be used, including anionic fatliquors such as sulfonated fatliquors and sulfited oils, soap fatliquors and cationic fatliquors. Nonionic fatliquors may also be used, including alkyl ethylene oxide condensates and protein emulsifiers. Multicharged fatliquors that are formulations of non-ionic, anionic and cationic fatliquors, may also be used for the fatliquoring process.

Raw material for the fatliquoring agents may be sea animal oils such as fish oil; land animal oils and fats such as claw oil, beef tallow, pig fat and bone fat; Vegetable oils and fats such as palm oil, sunflower oil, rapeseed oil, soybean oil, coconut fat, palm kernel fat and turkey red oil; waxes such as carnauba wax, montan wax and wool grease; synthetic fats such as paraffin oil, mineral oil, fatty alcohol and fatty acid ester.

It should generally be noted that further parts of a footwear may be made according to other methods or with further different means than the claimed leather assembly as long as least one part of the footwear is made with these inventive provisions or at least where leather layers have been bonded according to the inventive method.

The focus of the present application has generally been to improve parts of an upper of a footwear and no detailed information has been given regarding the fitting of an upper according to the provision of the invention to a sole, but it is within the ability of the skilled person to e.g. attach the upper to the sole by means of conventional cementing or injection molding.

In an embodiment of the invention, the only bonding of the two leather pieces, i.e. a leather base layer and a leather attachment layer is obtained through gluing.

In an embodiment of the invention, the only bonding of the two leather pieces, i.e. a leather base layer and a leather attachment layer is obtained through gluing.

In an embodiment of the invention, the footwear is stitch free.

The method described within the scope of the invention, wherein at least two leather pieces are bonded without stitches is advantageous. However, besides this method, other methods of adhering other leather pieces together in the resulting footwear may be applied either as replacing or by supplementing the gluing by other methods. Other methods that may be applied for other than the inventive bonding could e.g. be processes such as sewing including stitching or other relevant methods where stiches are applied in any kind.

Generally, when referring to cow as a source of hide for the leather, the reference refers to both calf or cow hides.

Figure 9:
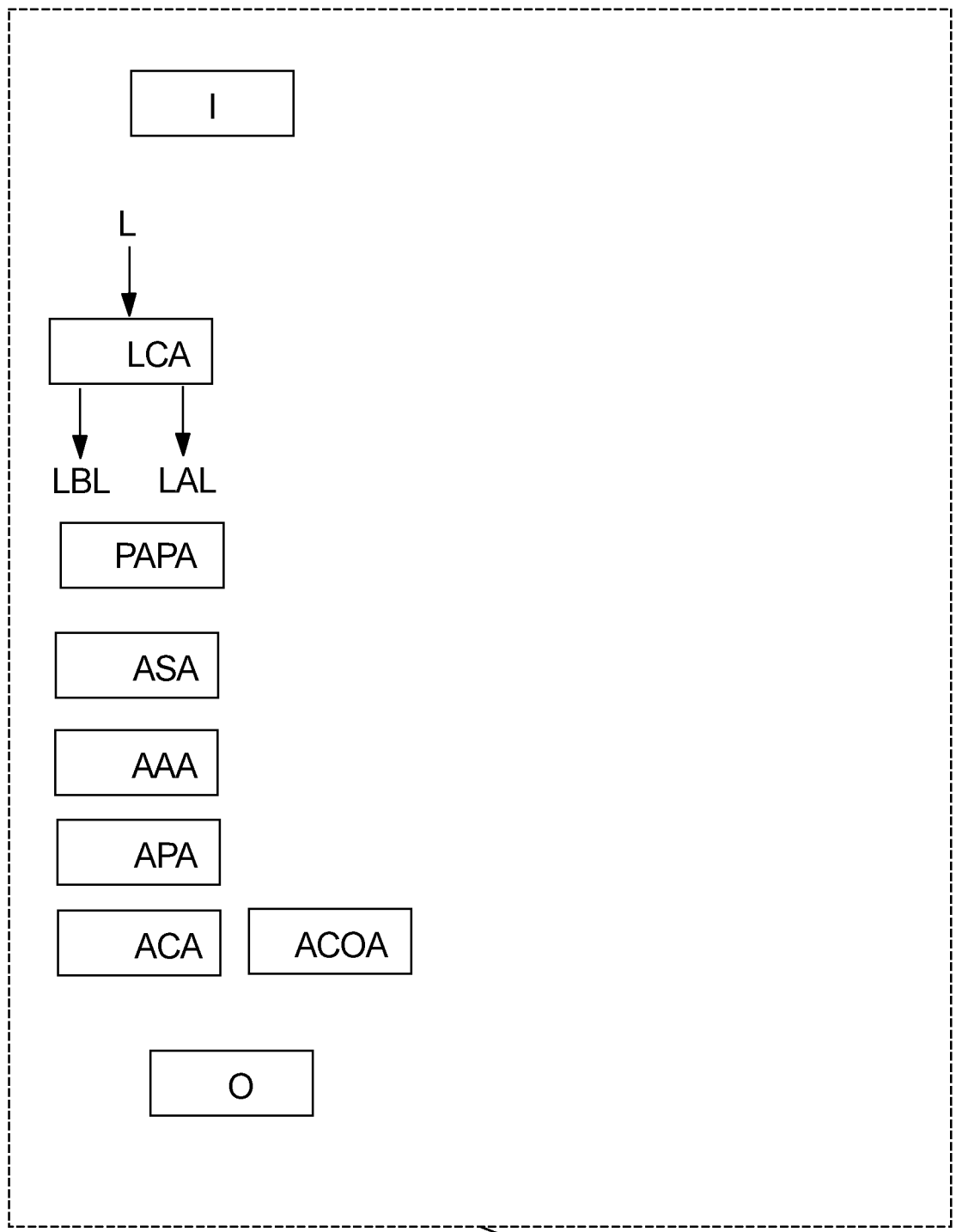

FIG. 9 illustrate an automatic footwear processing arrangement AFPA and different units to be applied within such a system.

The automatic footwear processing arrangement AFPA includes a number of units which may be applied in a footwear manufacturing line within the scope of the invention. Units may in the present context include separate units which may be gathered in other units or sub arrangements or a unit may be constructed as an arrangement including several co-operating units.

The automatic footwear processing arrangement AFPA include individual or co-working units as mentioned and described below.

The overall automatic footwear processing arrangement is designed to produce footwear or parts of footwear and the co-working units are configured to process leather footwear parts to be included in the manufacturing line. Footwear parts may typically refer to parts of a footwear which may be understood as a leather base layer LBL and a leather attachment layer LAL in relation to the inventive bonding within the scope of the invention.

The automatic footwear processing arrangement AFPA includes an input I and an output O.

Different further units may include a leather cutting arrangement LCA. The leather cutting arrangement may be configured for cutting out leather footwear parts, such as leather vamps, leather quarters, leather heels, etc. from larger leather layers. The footwear parts may also elsewhere in this application be more broadly referred to as a leather base layer LBL or a leather attachment layer LAL.

The arrangement may be configured for switching between different types, styles or designs of footwear parts and the output of the arrangement may not necessarily only be exactly one type of footwear part due to the fact that the subsequent adhesion between two footwear parts within the scope of the invention may be performed on different footwear parts and switch between footwear parts during the stacking process to follow. This is a completely different approach from stitching based lines, where such switch is basically impossible or pretty complex with today's stitching technologies.

A further unit may include a pre-adhesion processing arrangement PAPA. This unit is applied for automatically preparing the leather footwear parts for the subsequent bonding to other parts. This process may typically include removal of dust by suction, brushes or other applicable processes to ensure that the leather parts to be adhered are extremely clean as it has been experienced that contamination, e.g. from dust, fat, etc., may result in inferior final bonding of the footwear parts to be adhered. The automatic performing of this particular step is a great improvement in any footwear manufacturing line where leather parts of the footwear is to be bonded by adhering.

The pre-adhesion processing arrangement PAPA may include a number of preparation steps, including the above-mentioned, and the steps may be run according to pre-determined routines, i.e. a fixed number of pre-determined steps and the steps may each perform the pre-programmed task, e.g. at given time durations. This predetermined configuration may of course be changed and fit to the specific leather footwear parts to be processed. An alternative to such a pre-determined configuration is dynamically to adapt the process to the leather footwear parts in question e.g. by measuring data indicative of the state of the leather parts and thereby insert different steps, modify how steps are executed e.g. with respect to time.

A further unit must include an automatic stacking arrangement ASA. In this arrangement, two or more input footwear parts, i.e. at least a leather base layer LBL and a leather attachment layer LAL are automatically stacked to be at least partly overlapping. The stacking arrangement may be used simply to stack as the last preparation for activation of adhesive if the footwear parts have been pre-adhered with adhesive which may be activated after stacking. Alternatively, the unit may include a pre-adhering arrangement applying adhesive to the footwear parts previous to stacking or during stacking. The adhesive may be any of the types elsewhere referred to in this application, e.g. thermo adhesive, adhesive to be activated by radiation (e.g. UV), adhesive to be activated by chemistry etc. The pattern in which the adhesive is applied to the footwear parts may by performed automatically to ensure that the adhesive is only applied to where subsequent bonding is required. Alternative ways of applying adhesive may be to automatically position adhesive in the form of solid webs between the footwear parts.

The stacked footwear parts are then supplied to an automatic adhesive activation arrangement AAA. The arrangement is designed to activate the adhesive between the stacked parts. The activation may e.g. be by heating, radiation, ultrasonic, chemistry or any suitable way by means of which the desired activation and subsequent bonding may be obtained.

The stacked footwear parts, now with activated adhesive, may subsequently or simultaneously be subjected to pressure by an automatic pressure activation arrangement APA. This unit may be included in the above adhesive activation arrangement so as to subject the footwear leather parts to pressure and activation at the same time.

Subsequently the stacked and activated footwear parts are subjected to curing in an automatic curing arrangement ACA. This arrangement may be included in the above two arrangements or the stacked and activated footwear parts may be handed from the above units/arrangements to the automatic curing arrangement ACA as long as the footwear parts are still forced together under pressure until a sufficient bonding is obtained. The curing process, including control of temperature (actively), use of ambient temperature both at a predetermined time duration or e.g. dynamically determined by measuring of relevant process parameters or leather part parameters during the process. An efficient automatic control of curing time ensures the desired reliable bonding.

The curing may e.g. also, more specifically in relation to thermo activated adhesive, be performed by means of an optional automatic cooling arrangement ACOA.

Subsequent the bonded two or more footwear parts may be reintroduced into the system for automatic bonding to further leather footwear parts or it may be transferred automatically or manually into a finalization step where the footwear is finalized, e.g. with other footwear parts. The finalization may include manual process step in particular in relation to the process of converting the bonded 2D footwear parts into a 3D upper. Such process may include some manual but very limited stitching or even adhesion and then the footwear may be gathered with a sole, e.g. by cementing of the upper to a premade sole or by direct-injection of the sole to the upper and thereby outputting a final 3D footwear.

Subsequent process steps or supplementary process steps may be applied within the scope of the invention.

Figure 10A:
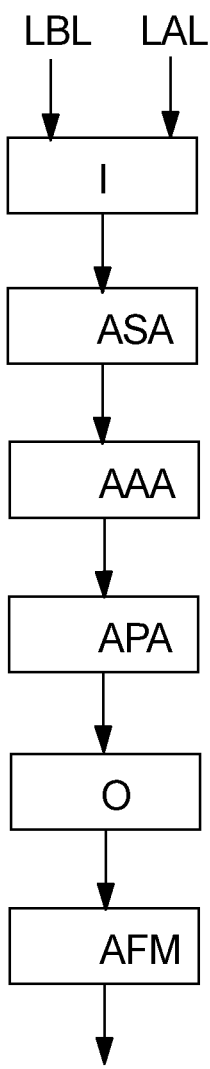
Figure 10B:
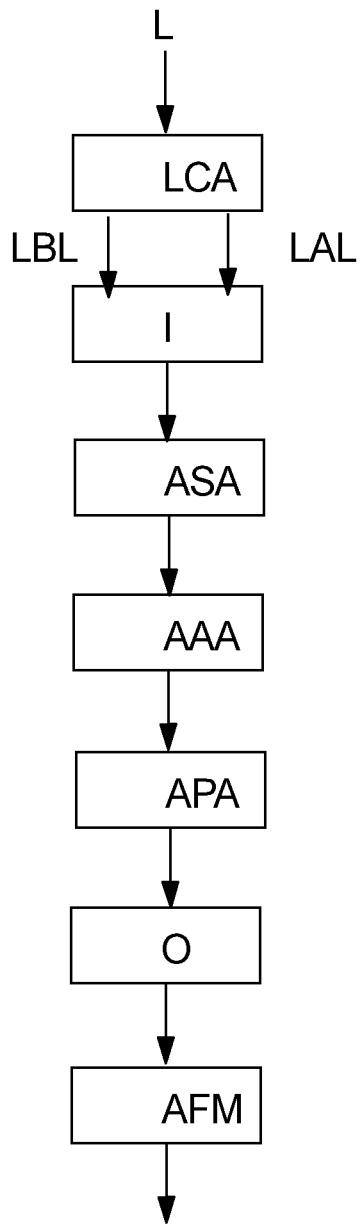
Figure 10C:
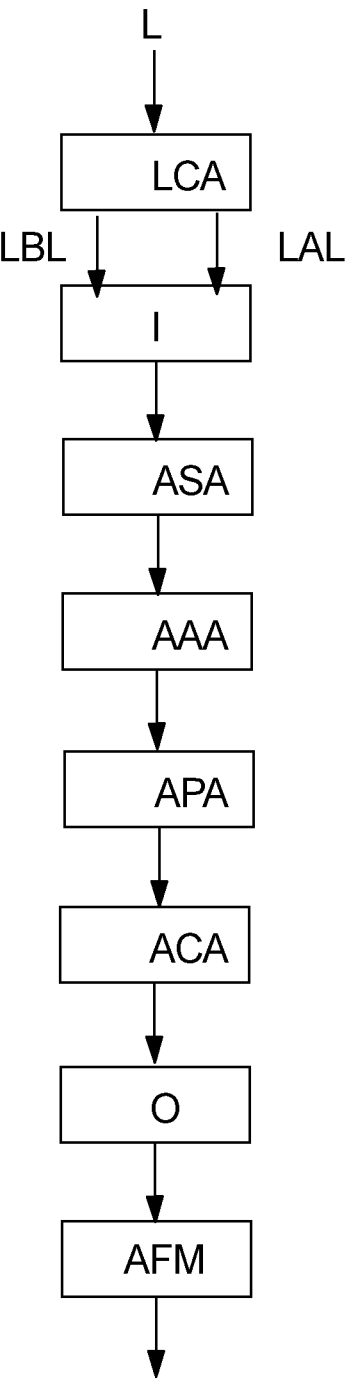

FIG. 10a-c illustrate different embodiments of footwear processing equipment within the scope of the invention, where the inventive method is applied automatically in at least significant parts of the manufacturing line.

As illustrated in FIGS. 10a-c, the processing arrangement may include that processed footwear parts subsequently are subjected to further steps, including automated footwear manufacturing AFM.

It should be noted that footwear comprising leather up until now during ages has been restricted or focused on applying stitching during the main process steps of the manufacturing of footwear. This is due to the fact that leather is extremely difficult to handle and adhesion may mainly have been applied for the purpose of attaching gadgets or used in other minor process steps where strength is not really an issue.

This is particular true in relation to stitching along the circumference or parts of circumferences of footwear parts, such as vamp, quarters, heel and/or tongue.

The illustrated configurations 10a-c are all within the scope of the invention with one or more of the illustrated units/arrangements as described in FIG. 10.

The invention claimed is:

1. A method of manufacturing a footwear, the method comprising steps of:
   providing a leather base layer;
   providing a leather attachment layer;
   fixing the leather base layer and the leather attachment layer against each other with an intermediate application of adhesive between them;
   activating the applied adhesive by subjecting the adhesive to heat over a period of time, and/or to a temperature, by which at least one of the leather base layer and the leather attachment layer shrinks to within a predetermined dimension range;
   forcing the leather base layer and the leather attachment layer against each other under a pressure P with the adhesive between them;
   curing or hardening the adhesive and thereby bonding the leather base layer and the leather attachment layer to each other; and
   integrating the leather base layer and the leather attachment layer, after the bonding, as part of the footwear.

2. The method of manufacturing the footwear according to claim 1, wherein the step of forcing the leather base layer and the leather attachment layer against each other under the pressure P with the adhesive between them occurs while the step of activating the applied adhesive is occurring.

3. The method of manufacturing the footwear according to claim 2, wherein pressure P is at least 2 bars.

4. The method of manufacturing the footwear according to claim 1, wherein the step of curing or hardening the adhesive is performed while the step of forcing the leather base layer and the leather attachment layer against each other under the pressure P with the adhesive between is occurring.

5. The method of manufacturing the footwear according to claim 1, wherein the step of curing or hardening the adhesive involves cooling the adhesive, thereby bonding the leather base layer and the leather attachment layer to each other.

6. The method of manufacturing the footwear according to claim 1, wherein the applied adhesive is activated by subjecting the adhesive to UV-radiation (UV: Ultra violet radiation), IR (IR: Infrared radiation), Ultrasound, or any combination thereof.

7. The method of manufacturing the footwear according to claim 1, wherein the adhesive is formed of a thermoplastic material.

8. The method of manufacturing the footwear according to claim 7, wherein the thermoplastic material is a co-polyamide.

9. The method of manufacturing the footwear according to claim 1, wherein the adhesive is a hot-melt adhesive having a Tg (Tg: glass transition temperature) between 100 degrees Celsius and 200 degrees Celsius.

10. The method of manufacturing the footwear according to claim 1, wherein a duration of the step of subjecting the adhesive to heat is at least 15 sec.

11. The method of manufacturing the footwear according to claim 1, wherein the leather base layer is forming at least part of a leather quarter, a leather vamp, a leather counter, and/or a toe cap of a footwear.

12. A method implemented by an automatic footwear processing arrangement having an input (I) and an output (O), wherein a method of providing a leather base layer and a leather attachment layer is performed in an automatic process comprising:
   transporting the leather base layer and the leather attachment layer from the input (I); and
   stacking the leather base layer and the leather attachment layer, one layer at least partially overlapping the other layer,
   wherein an activation of an adhesive is performed automatically via an automatic adhesive activation arrangement,
   wherein the automatic adhesive activation arrangement subjects the adhesive to heat continued over a period of time, and/or to a temperature, by which at least one of the leather base layer and the leather attachment layer shrinks to within a predetermined dimension range, and
   wherein the process further comprises forcing the leather base layer and the leather attachment layer against each other under a pressure P with the adhesive between them via an automatic pressure activation arrangement.

13. The method according to claim 12, wherein the adhesive to be activated is pre-adhered to the leather base layer and/or the leather attachment layer.

14. The method according to claim 12, wherein two or more input footwear parts, including at least the leather base layer LBL and the leather attachment layer, are automatically stacked to be at least partly overlapping by an automatic stacking arrangement.

15. The method according to claim 12, wherein footwear parts, including at least the leather base layer and the leather attachment layer, are automatically cleaned/removal of dust/preprocessed prior to reactivation of the adhesive already present on the leather footwear parts and/or prior to the application of adhesive to the footwear parts via a pre-adhesion processing arrangement.

\* \* \* \* \*